US012484398B2

(12) United States Patent
Lee et al.

(10) Patent No.: US 12,484,398 B2
(45) Date of Patent: Nov. 25, 2025

(54) TRANSPARENT DISPLAY DEVICE

(71) Applicant: LG Display Co., Ltd., Seoul (KR)

(72) Inventors: MiReum Lee, Paju-si (KR); JaeHee Park, Paju-si (KR); Jonghyeok Im, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 661 days.

(21) Appl. No.: 17/869,705

(22) Filed: Jul. 20, 2022

(65) Prior Publication Data

US 2023/0030854 A1 Feb. 2, 2023

(30) Foreign Application Priority Data

Jul. 30, 2021 (KR) .................. 10-2021-0100818

(51) Int. Cl.
*H10K 59/131* (2023.01)
*G06F 3/044* (2006.01)
*H10K 59/35* (2023.01)
*H10K 59/40* (2023.01)
*H10K 59/80* (2023.01)

(52) U.S. Cl.
CPC ......... *H10K 59/131* (2023.02); *G06F 3/0446* (2019.05); *H10K 59/1315* (2023.02); *H10K 59/353* (2023.02); *H10K 59/40* (2023.02); *H10K 59/8792* (2023.02); *G06F 2203/04111* (2013.01)

(58) Field of Classification Search
None
See application file for complete search history.

(56) References Cited

U.S. PATENT DOCUMENTS

| | | | |
|---|---|---|---|
| 2016/0209971 A1* | 7/2016 | Kim | G06F 3/0443 |
| 2021/0202628 A1 | 7/2021 | Kim et al. | |
| 2022/0113826 A1* | 4/2022 | Huang | H10K 50/84 |
| 2023/0033385 A1* | 2/2023 | Park | G06F 3/0443 |

FOREIGN PATENT DOCUMENTS

KR 20160150486 A 12/2016

\* cited by examiner

*Primary Examiner* — Cory W Eskridge
(74) *Attorney, Agent, or Firm* — Seed Intellectual Property Law Group LLP

(57) ABSTRACT

A transparent display device is provided, which may reduce a parasitic capacitance average value of touch lines and improve uniformity of parasitic capacitance. The transparent display comprises a substrate provided with a non-transmissive area and a transmissive area, the non-transmissive area including at least two light emission areas in which a light emitting element is disposed and at least two circuit areas in which a circuit element is disposed, a plurality of first signal lines provided in the non-transmissive area over the substrate and extended in a first direction, at least one insulating layer provided over the first signal line, and a plurality of touch lines provided in the non-transmissive area over the at least one insulating layer and extended in the first direction. The plurality of first signal lines and the plurality of touch lines are disposed between adjacent circuit areas.

27 Claims, 15 Drawing Sheets

TRANSPARENT DISPLAY DEVICE

BACKGROUND

Technical Field

The present disclosure relates to a transparent display device.

Description of the Related Art

With the advancement of the information age, the demand for a display device for displaying an image has increased in various forms. Therefore, various types of display devices such as a liquid crystal display (LCD) device, a plasma display panel (PDP) device, a quantum dot light emitting display (QLED) device and an organic light emitting display (OLED) device have been recently used.

Recently, studies for a transparent display device in which a user may view objects or images positioned at an opposite side by transmitting through the display device are actively ongoing.

A transparent display device includes a display area on which an image is displayed, wherein the display area may include a transmissive area through which external light may transmit, and a non-transmissive area. The transparent display device may have high light transmittance in the display area through the transmissive area. Such a transparent display device may include a plurality of touch lines to implement a touch function.

BRIEF SUMMARY

The inventors have realized that light transmittance of the transparent display device may be reduced due to the plurality of touch lines, and parasitic capacitance may be increased due to a narrow spacing distance between signal lines and the touch lines.

The present disclosure has been made in view of the above problems and it is a benefit of the present disclosure that embodiments of a transparent display device may minimize or reduce loss of light transmittance caused by a touch line.

It is another benefit of the present disclosure to provide a transparent display device that has reduced parasitic capacitance between a signal line and a touch line.

It is another benefit of the present disclosure to provide a transparent display device that has improved uniformity of parasitic capacitance between a signal line and a touch line.

In addition to the benefits of the present disclosure as mentioned above, additional benefits and features of the present disclosure will be clearly understood by those skilled in the art from the following description of the present disclosure.

In accordance with an embodiment of the present disclosure, the above and other benefits can be accomplished by the provision of a transparent display device comprising a substrate provided with a non-transmissive area and a transmissive area, the non-transmissive area including at least two light emission areas in which a light emitting element is disposed and at least two circuit areas in which a circuit element is disposed, a plurality of first signal lines provided in the non-transmissive area over the substrate and extended in a first direction, at least one insulating layer provided over the plurality of first signal lines, and a plurality of touch lines provided in the non-transmissive area over the at least one insulating layer and extended in the first direction. The plurality of first signal lines and the plurality of touch lines are disposed between adjacent circuit areas of the at least two circuit areas.

In accordance with another embodiment of the present disclosure, the above and other benefits can be accomplished by the provision of a transparent display device comprising a transmissive area in which a touch sensor is disposed, and a non-transmissive area in which a light emitting element is disposed, wherein the non-transmissive area includes a first signal line area in which a plurality of first signal lines extended in a first direction and supplying a signal to the light emitting element and a plurality of touch lines extended in the first direction and electrically connected to the touch sensor are disposed, and a circuit area in which a circuit element connected to the light emitting element is disposed, including a first circuit area and a second circuit area, which are disposed to be symmetrical to each other with the first signal line area interposed therebetween.

BRIEF DESCRIPTION OF THE SEVERAL VIEWS OF THE DRAWINGS

The above and other benefits, features and other advantages of the present disclosure will be more clearly understood from the following detailed description taken in conjunction with the accompanying drawings, in which.

DETAILED DESCRIPTION

Figure 1:
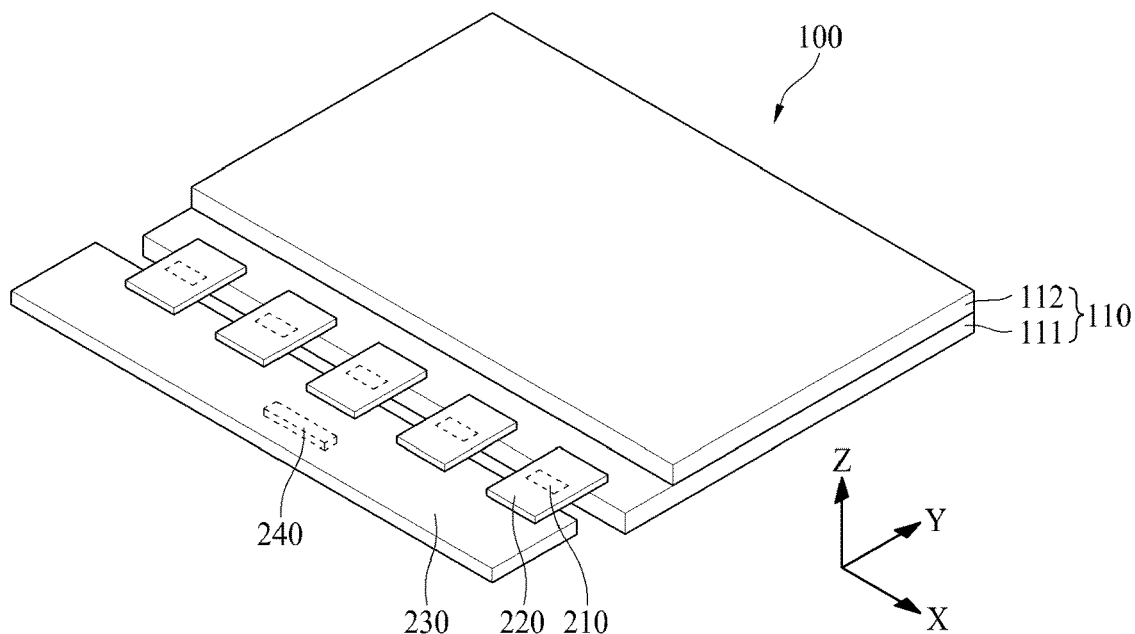
FIG. 1 is a perspective view illustrating a transparent display device according to one embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a case where 'comprise,' 'have,' and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~,' 'above~,' 'below~,' and 'next to~,' one or more portions may be arranged between two other portions unless 'just' or 'direct' is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," etc., may be used. These terms are intended to identify the corresponding elements from the other elements, and basis, order, or number of the corresponding elements are not limited by these terms. The expression that an element is "connected" or "coupled" to another element should be understood that the element may directly be connected or coupled to another element but may directly be connected or coupled to another element unless specially mentioned, or a third element may be interposed between the corresponding elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Figure 2:
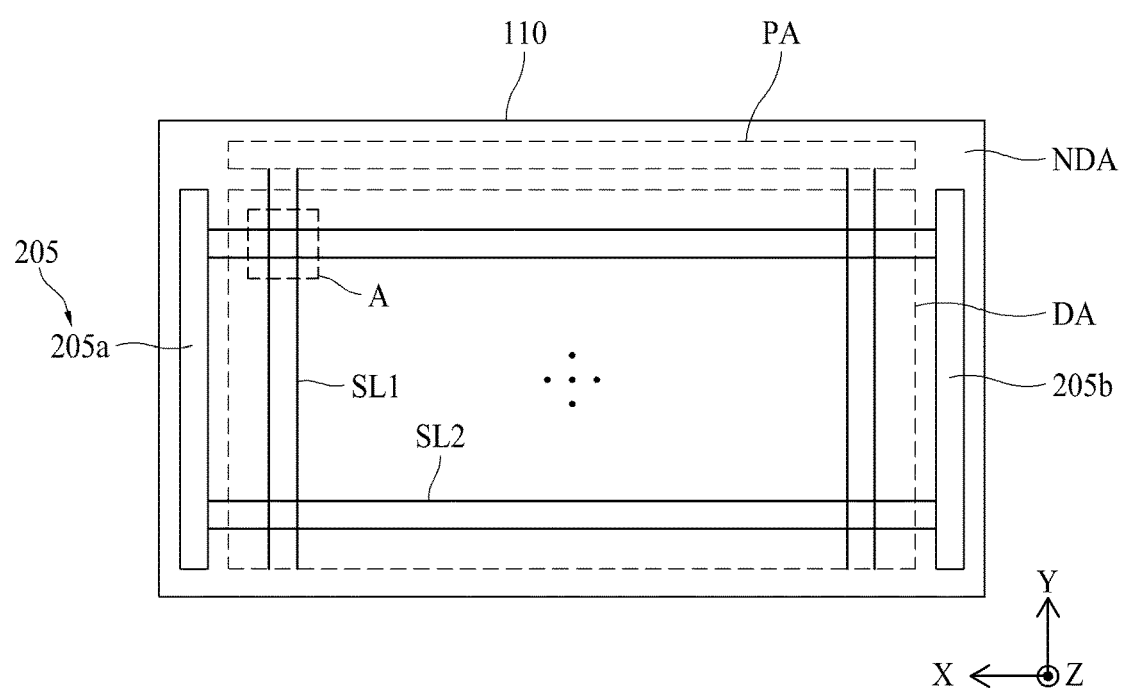
FIG. 2 is a schematic plan view illustrating a transparent display panel according to one embodiment of the present disclosure.

FIG. 1 is a perspective view illustrating a transparent display device according to one embodiment of the present disclosure, and FIG. 2 is a schematic plan view illustrating a transparent display panel according to one embodiment of the present disclosure.

Hereinafter, X axis indicates a line parallel with a scan line, Y axis indicates a line parallel with a data line, and Z axis indicates a height direction of a transparent display device 100.

Although a description has been described based on that the transparent display device 100 according to one embodiment of the present disclosure is embodied as an organic light emitting display device, the transparent display device 100 may be embodied as a liquid crystal display device, a plasma display panel (PDP), a quantum dot light emitting display (QLED) or an electrophoresis display device.

Referring to FIG. 1 and FIG. 2, a transparent display device 100 according to one embodiment of the present disclosure includes a transparent display panel 110, a source drive integrated circuit (hereinafter, referred to as "IC") 210, a flexible film 220, a circuit board 230, and a timing controller 240.

The transparent display panel 110 includes a first substrate 111 and a second substrate 112, which face each other. The second substrate 112 may be an encapsulation substrate. The first substrate 111 may be a plastic film, a glass substrate, or a silicon wafer substrate formed using a semiconductor process. The second substrate 112 may be a plastic film, a glass substrate, or an encapsulation film. The first substrate 111 and the second substrate 112 may be made of a transparent material.

The transparent display panel 110 may include a display area DA provided with pixels P to display an image, and a non-display area NDA for not displaying an image.

The display area DA may be provided with a first signal lines SL1, a second signal lines SL2 and the pixels. The non-display area NDA may be provided with a pad area PA in which pads are disposed, and at least one scan driver 205.

The first signal lines SL1 may be extended in a first direction (e.g., Y-axis direction). The first signal lines SL1 may cross the second signal lines SL2 in the display area DA. The pixels may be provided in an area where the first signal line SL1 and the second signal line SL2 cross each other, and emits predetermined or selected light to display an image.

The scan driver may be provided in one side of the display area of the transparent display panel 110, or the non-display area of both peripheral sides of the transparent display panel 110 by a gate driver in panel (GIP) method. In another way, the scan driver may be manufactured in a driving chip, may be mounted on the flexible film, and may be attached to one peripheral side or both peripheral sides of the display area of the transparent display panel 110 by a tape automated bonding (TAB) method.

For example, the scan driver 205, as shown in FIG. 2, may include a first scan driver 205a provided in the non-display area NDA disposed over a first peripheral side of the display area DA, and a second scan driver 205b provided in the non-display area NDA disposed over a second peripheral side of the display area DA, but is not limited thereto.

The source drive IC 210 receives digital video data and source control signals from the timing controller 240. The source drive IC 210 converts the digital video data into analog data voltages in accordance with the source control signal, and supplies the analog data voltages to the data lines. If the source drive IC 210 is manufactured in a driving chip, the source drive IC 210 may be mounted on the flexible film 220 by a chip on film (COF) method or a chip on plastic (COP) method.

Pads, such as power pads and data pads, may be formed in a non-display area of the transparent display panel 110. Lines connecting the pads with the source drive IC 210 and lines connecting the pads with lines of the circuit board 230 may be formed in the flexible film 220. The flexible film 220 may be attached onto the pads using an anisotropic conducting film, whereby the pads may be connected with the lines of the flexible film 220.

The transparent display panel 110 may further include a touch line and a touch sensor in addition to the first signal line SL1, the second signal line SL2 and the pixel in order to implement a touch function. A detailed description of the touch line and the touch sensor will be described later with reference to FIGS. 3 to 15.

Figure 3:
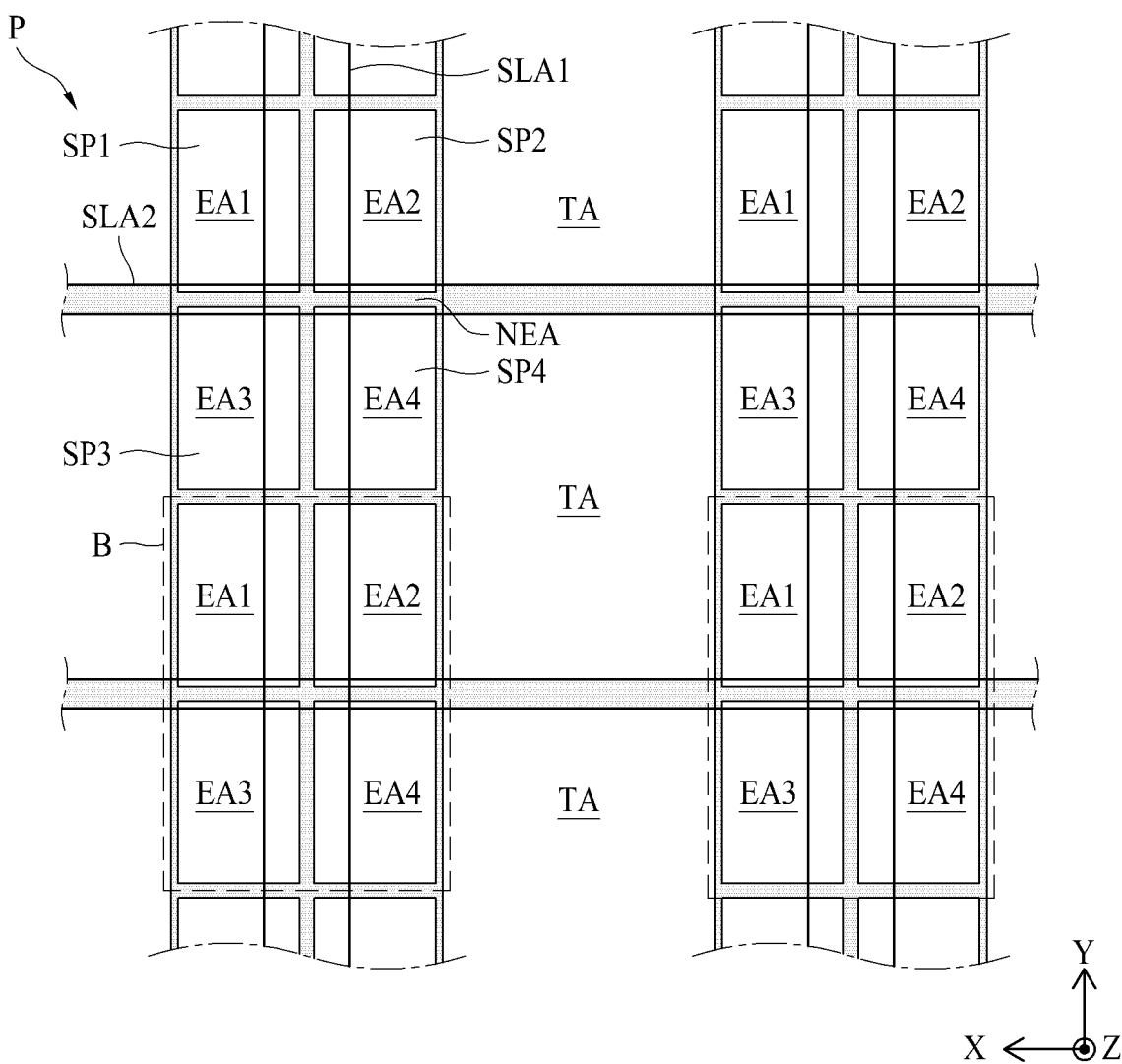
FIG. 3 is a schematic view illustrating an example of a pixel provided in an area A of FIG. 2.
Figure 4:
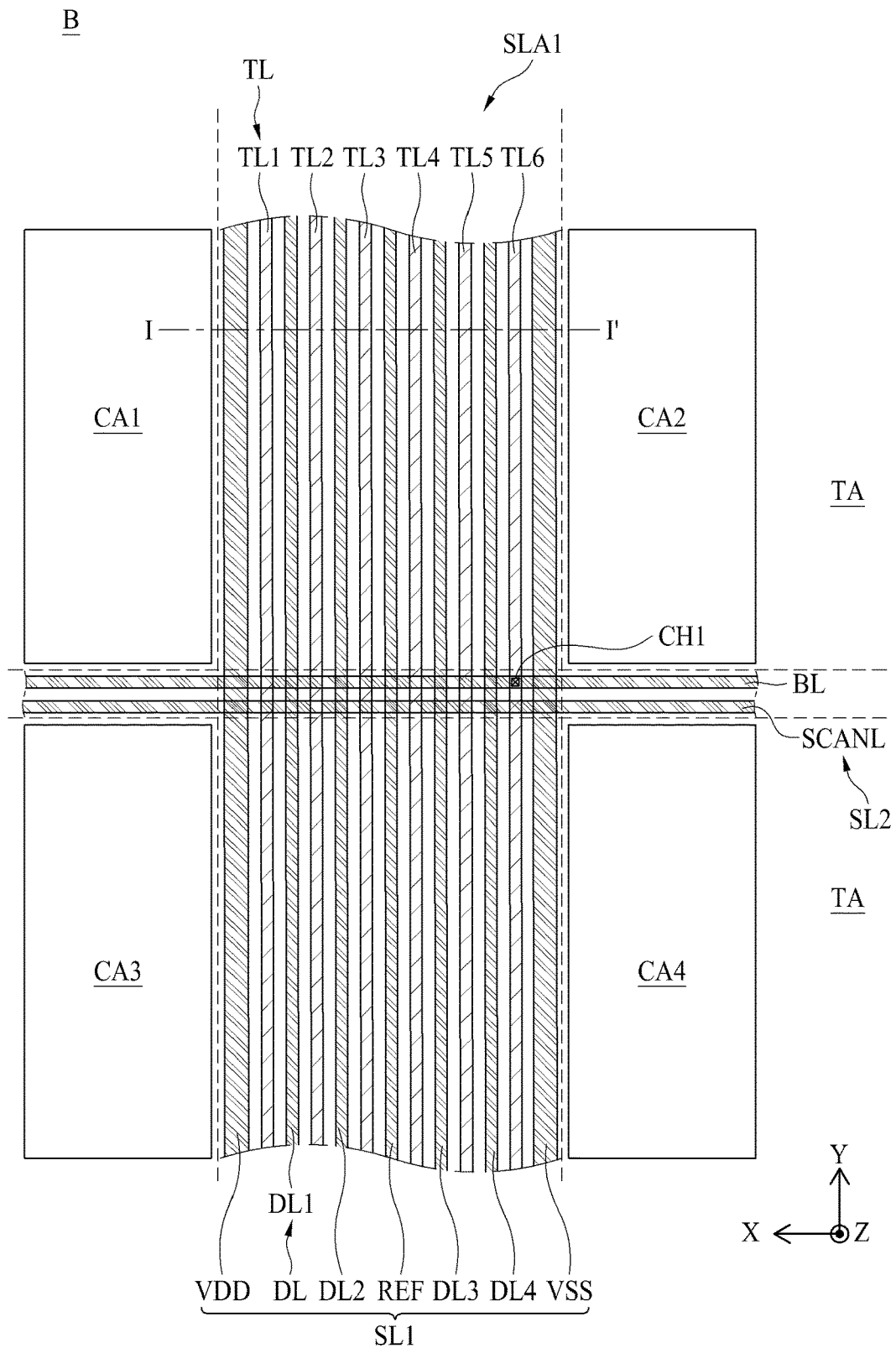
FIG. 4 is a view illustrating an example of signal lines and touch lines, which are provided in an area B of FIG. 3.
Figure 5:
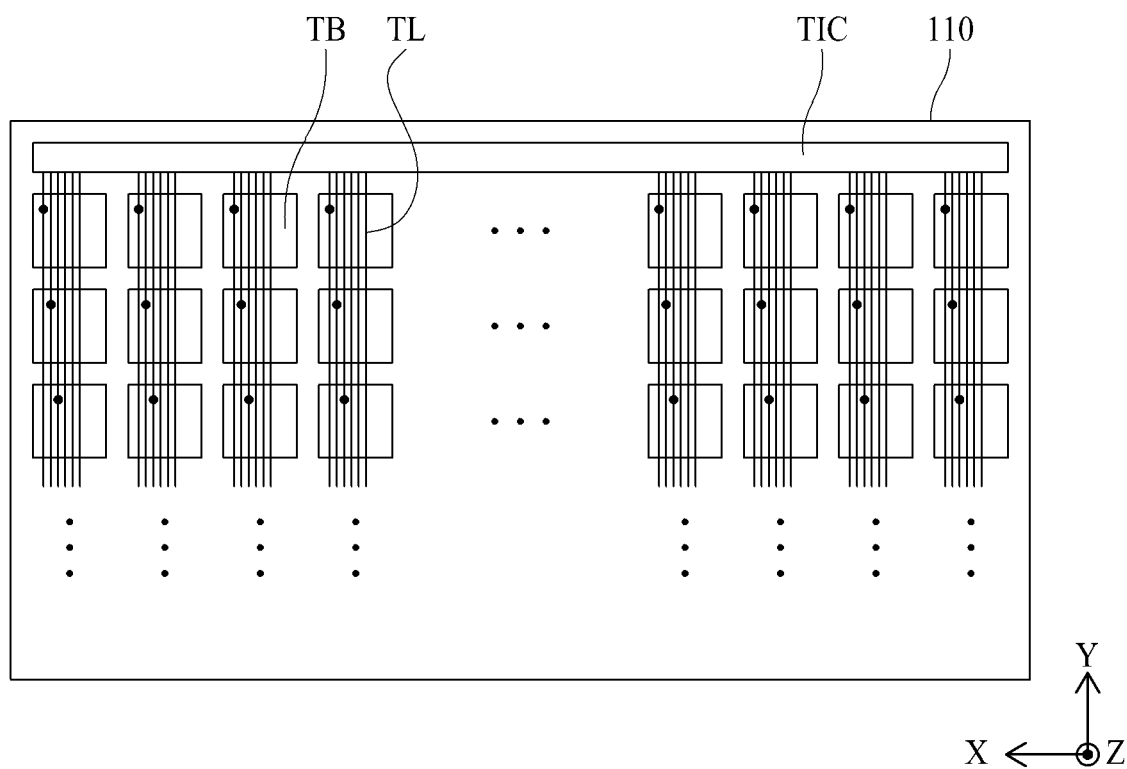
FIG. 5 is a view illustrating a connection relation between a plurality of touch blocks and a plurality of touch lines.
Figure 6:
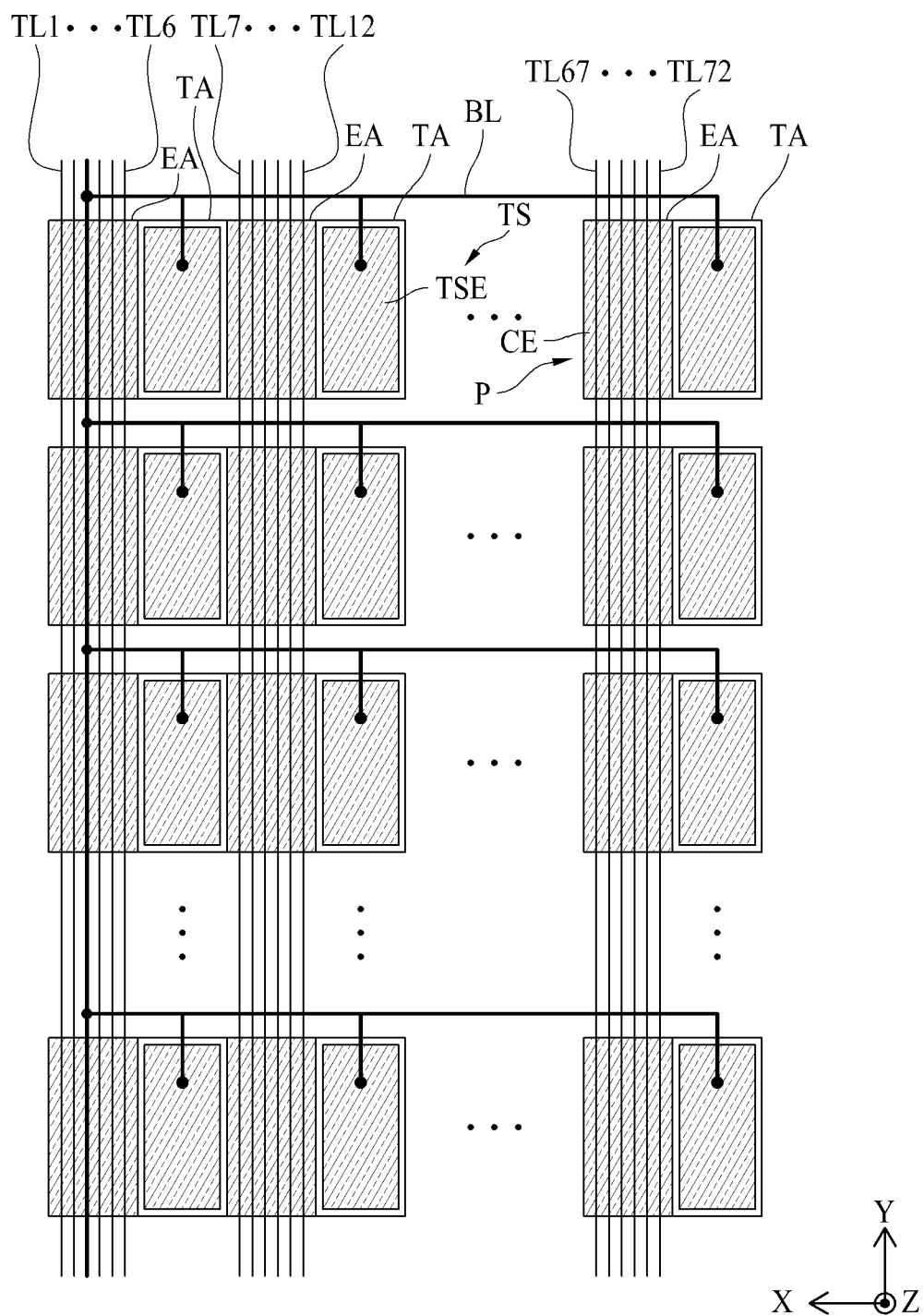
FIG. 6 is a view illustrating a connection relation between a plurality of touch lines and a plurality of touch sensors in one touch block.

FIG. 3 is a schematic view illustrating an example of a pixel provided in an area A of FIG. 2, and FIG. 4 is a view illustrating an example of signal lines and touch lines, which are provided in an area B of FIG. 3. FIG. 5 is a view illustrating a connection relation between a plurality of touch blocks and a plurality of touch lines, and FIG. 6 is a view illustrating a connection relation between a plurality of touch lines and a plurality of touch sensors in one touch block.

The display area DA, as shown in FIG. 3, includes a transmissive area TA and a non-transmissive area. The transmissive area TA is an area through which most of externally incident light passes, and the non-transmissive area is an area through which most of externally incident light fails to transmit. For example, the transmissive area TA may be an area where light transmittance is greater than $\alpha$%, for example, about 90%, and the non-transmissive area may be an area where light transmittance is smaller than $\beta$%, for example, about 50%. At this time, $\alpha$ is greater than $\beta$. A user may view an object or background arranged over a rear surface of the transparent display panel 110 due to the transmissive area TA.

The non-transmissive area may include a first signal line area SLA1, a second signal line area SLA2 and a plurality of pixels P.

Pixels P may be provided to at least partially overlap at least one of the first signal line area SLA1 and the second signal line area SLA2, thereby emitting predetermined or selected light to display an image. An emission area EA may correspond to an area, from which light is emitted, in the pixel P.

Each of the pixels P, as shown in FIG. 3, may include at least one of a first subpixel SP1, a second subpixel SP2, a third subpixel SP3 and a fourth subpixel SP4. The first subpixel SP1 may include a first emission area EA1 emitting light of a first color. The second subpixel SP2 may include a second emission area EA2 emitting light of a second color. The third subpixel SP3 may include a third emission area EA3 emitting light of a third color. The fourth subpixel SP4 may include a fourth emission area EA4 emitting light of a fourth color.

In one embodiment, the first to fourth emission area EA1, EA2, EA3 and EA4 may emit light of different colors. For example, the first emission area EA1 may emit light of a green color. The second emission area EA2 may emit light of a red color. The third emission area EA3 may emit light of a blue color. The fourth emission area EA4 may emit light of a white color.

In another embodiment, at least two of first to fourth emission area EA1, EA2, EA3 and EA4 may emit light of the same color. For example, the first emission area EA1 and the second emission area EA2 may emit light of a green color. The third emission area EA3 may emit light of a red color. The fourth emission area EA4 may emit light of a blue color. However, the emission areas are not limited to this example. Each of the pixels P may further include a subpixel emitting light of a color other than red, green, blue and white. Also, the arrangement order of the subpixels SP1, SP2, SP3 and SP4 may be changed in various ways.

Hereinafter, for convenience of description, a description will be given based on that the first subpixel SP1 is a green subpixel emitting green light, the second subpixel SP2 is a red subpixel emitting red light, the third subpixel SP3 is a blue subpixel emitting blue light, and the fourth subpixel SP4 is a white subpixel emitting white light.

The first signal line area SLA1 may be extended in the first direction (Y-axis direction) in the display area DA, and may be disposed to at least partially overlap the light emission area EA1, EA2, EA3 and EA4. The transparent display panel 110 may be provided with a plurality of first signal line areas SLA1, and may be provided with a transmissive area between two adjacent first signal line areas. The first signal line SL1 extended in the first direction (Y-axis direction) and the touch line TL extended in the first direction (Y-axis direction) may be disposed to be spaced apart from each other in the first signal line SLA1.

The first signal line SL1 may be provided as a plurality of first signal lines SL1, and may include at least one of a pixel power line VDD, a common power line VSS, a reference line REF, or data lines DL1, DL2, DL3 and DL4.

The pixel power line VDD may supply a first power source to a driving transistor TFT of each of the subpixels SP1, SP2, SP3 and SP4 provided in the display area DA. The common power line VSS may supply a second power source to a second electrode 140 of the subpixels SP1, SP2, SP3 and SP4 provided in the display area DA. At this time, the second power source may be a common power source commonly supplied to the subpixels SP1, SP2, SP3 and SP4.

The reference line REF may supply an initialization voltage (or sensing voltage) to the driving transistor TFT of each of the subpixels SP1, SP2, SP3 and SP4 provided in the display area DA.

When the plurality of first signal lines SL1 include the pixel power line VDD, the common power line VSS, the reference line REF and the data line DL1, DL2, DL3 and DL4, the pixel power line VDD and the common power line VSS may be disposed outside the plurality of data lines DL1, DL2, DL3 and DL4. For example, the pixel power line VDD may be disposed outside the first data line DL1 provided at the leftmost of the plurality of data lines DL1, DL2, DL3 and DL4, and the common power line VSS may be disposed outside the fourth data line DL4 provided at the rightmost of the plurality of data lines DL1, DL2, DL3 and DL4.

Since a higher voltage is applied to the pixel power line VDD and the common power line VSS than that applied to the other signal lines, the pixel power line VDD and the common power line VSS preferably have a larger area than the other signal lines. Therefore, the pixel power line VDD and the common power line VSS may be disposed outside the plurality of data lines DL1, DL2, DL3 and DL4, and thus may be formed to be wider than the reference line REF and the data lines DL1, DL2, DL3 and DL4.

The reference line REF may be disposed between the plurality of data lines DL1, DL2, DL3 and DL4. For example, the reference line REF may be disposed at the center of the plurality of data lines DL1, DL2, DL3 and DL4, that is, between the second data line DL2 and the third data line DL3.

The reference line REF may be diverged and connected to the plurality of subpixels SP1, SP2, SP3 and SP4. In detail, the reference line REF may be connected to circuit elements of the plurality of subpixels SP1, SP2, SP3 and SP4 to supply a reference signal to each of the subpixels SP1, SP2, SP3 and SP4.

When the reference line REF is disposed to be close to an edge of the first signal line area SLA1, a deviation between connection lengths from the diverged point to the circuit element of each of the plurality of subpixels SP1, SP2, SP3 and SP4 is increased. For example, when the reference line REF is disposed at the leftmost side of the area where the first signal line area SLA1 is provided, the connection length from the diverged point to the circuit element disposed over a right side of the first signal line area SLA1 may be greater than the connection length from the diverged point to the circuit element disposed over a left side of the first signal line area SLA1. In this case, a difference between the signal supplied to the circuit area disposed over the right side of the first signal line area SLA1 and the signal supplied to the circuit area disposed over the left side of the first signal line area SLA1 may occur.

In the transparent display panel 110 according to one embodiment of the present disclosure, the reference line REF may be disposed between the plurality of data lines DL1, DL2, DL3 and DL4, whereby the deviation between the connection lengths to the circuit elements of the respective subpixels SP1, SP2, SP3 and SP4 may be minimized or reduced. Therefore, the reference line REF may uniformly supply signals to the circuit element of each of the plurality of subpixels SP1, SP2, SP3 and SP4.

Each of the first to fourth data lines DL1, DL2, DL3 and DL4 may supply a data voltage to at least one of the subpixels SP1, SP2, SP3 and SP4. For example, the first data line DL1 may supply a first data voltage to a first driving transistor TFT of the first subpixel SP1, the second data line DL2 may supply a second data voltage to a second driving transistor TFT of the second subpixel SP2, the third data line DL3 may supply a third data voltage to a third driving transistor TFT of the third subpixel SP3, and the fourth data line DL4 may supply a fourth data voltage to a fourth driving transistor TFT of the fourth subpixel SP4.

The transparent display panel 110 according to one embodiment of the present disclosure is characterized in that the touch line TL is further disposed in the first signal line area SLA1.

The touch line TL may be electrically connected to the touch sensors to detect a change in capacitance formed in each of the touch sensors. In detail, the transparent display panel 110 according to one embodiment of the present disclosure may include a plurality of touch blocks TB as shown in FIG. 5. Each of the plurality of touch blocks TB may include a plurality of pixels P and a plurality of transmissive areas TA disposed to correspond to the plurality of pixels P one-to-one as a basic unit or structure for determining a user touch position.

As shown in FIG. 6, the transparent display panel 110 according to one embodiment of the present disclosure may include a touch sensor TS in the transmissive area TA. For example, each of the plurality of touch blocks TB may include 12×15 pixels P and 12×15 touch sensors TS. In this case, when image resolution is 1920×1080, touch resolution may be 160×72.

At this time, the touch sensor TS may include a touch sensor electrode TSE. The touch sensor electrode TSE may be formed of the same material in the same layer as the cathode electrode CE of the pixel P. In this case, the touch sensor electrode TSE and the cathode electrode CE may be disposed to be spaced apart from each other.

In the transparent display panel 110 according to one embodiment of the present disclosure, as each of the plurality of touch lines TL is connected to one of the plurality of touch blocks TB, a change in capacitance of the touch sensors TS provided in the connected touch block TB may be sensed. That is, the plurality of touch lines TL provided in the transparent display panel 110 may correspond to the plurality of touch blocks TB one-to-one. Therefore, the number of touch lines TL may be the same as the number of touch blocks TB in the transparent display panel 110.

For example, when the number of touch blocks TB is 160×72, the touch line TL may also be 160×72, and may be connected to the touch driver TIC.

As described above, in order to form the touch lines TL as much as the number of touch blocks TB, at least two touch lines TL should be provided in one first signal line area SLA1. For example, when image resolution is 1920×1080 and touch resolution is 160×72, six touch lines TL1, TL2, TL3, TL4, TL5 and TL6 may be provided in one first signal line area SLA1, as shown in FIGS. 4 and 6, in order to form 160×72 touch lines TL in the transparent display panel 110.

The plurality of touch sensors TS provided in one touch block TB may be connected to one of the plurality of touch lines TL provided in one touch block TB as shown in FIG. 6. For example, twelve first signal line areas SLA1 may be provided in one touch block TB, and six touch lines TL1, TL2, TL3, TL4, TL5 and TL6 may be disposed in each of the twelve first signal line areas SLA1. As a result, one touch block TB may be provided with 72 touch lines TL1, . . . , TL72. In this case, the plurality of touch sensors TS provided in one touch block TB may be connected to one specific touch line TL of one of the 72 touch lines TL1, . . . , TL72. At this time, the specific touch line TL may be connected to the plurality of touch sensors TS arranged in the second direction (X-axis direction) through the bridge lines BL extended in the second direction (X-axis direction).

As described in, each of the plurality of touch lines TL may correspond to the touch blocks TB one-to-one. Each touch line TL connects the plurality of touch sensors TS provided in a corresponding touch block TB to the touch driver TIC. In detail, each touch line TL may transfer the changed capacitance provided from the touch sensors TS provided in the touch block TB to the touch driver TIC. The touch driver TIC may sense the change in capacitance, and may determine a touch position of a user. Further, each touch line TL may provide a sensing voltage generated from the touch driver TIC to the touch sensors TS provided in the touch block TB.

At least two touch lines TL may be provided in the first signal line area SLA1. When the plurality of touch lines TL are disposed in the transmissive area TA of the transparent display panel 110, light transmittance may be deteriorated due to the plurality of touch lines TL.

Also, a slit, specifically an elongated linear or rectangular shape, may be formed between the plurality of touch lines TL. When external light passes through the slit, a diffraction phenomenon may occur. According to the diffraction phenomenon, light corresponding to plane waves may be changed to spherical waves as the light passes through the slit, and an interference phenomenon may occur in the spherical waves. Therefore, constructive interference and destructive interference occur in the spherical waves, whereby the external light that has passed through the slit may have irregular light intensity. As a result, in the transparent display panel 110, definition of an object or image positioned at an opposite side may be reduced. For this reason, the plurality of touch lines TL are preferably disposed in the non-transmissive area rather than the transmissive area TA.

However, in the transparent display panel 110, a size of the non-transmissive area is very smaller than that of a general display panel, and a plurality of signal lines, a circuit element and a light emitting element are all formed in such a small area. Therefore, there is a spatial restriction in arrangement of the plurality of touch lines TL in the non-transmissive area, and a problem due to an increase in parasitic capacitance may occur due to a close distance between the plurality of touch lines and the other signal lines.

The transparent display panel 110 according to one embodiment of the present disclosure proposes an arrangement structure that may reduce an average value of parasitic capacitance and improve uniformity of parasitic capacitance when a plurality of touch lines TL are disposed in a non-transmissive area.

As shown in FIG. 4, the touch line TL may include a plurality of touch lines that may be alternately disposed with the plurality of first signal lines SL1. For example, the touch line TL may include six touch lines TL1, TL2, TL3, TL4, TL5 and TL6. The first touch line TL1 may be disposed between the pixel power line VDD and the first data line DL1, the second touch line TL2 may be disposed between the first data line DL2 and the second data line DL2, and the third touch line TL3 may be disposed between the second data line DL2 and the reference line REF. The fourth touch line TL4 may be disposed between the reference line REF and the third data line DL3, the fifth touch line TL5 may be disposed between the third data line DL3 and the fourth data line DL4, and the sixth touch line TL6 may be disposed between the fourth data line DL4 and the common power line VSS. However, the touch lines are not limited to the above example.

The transparent display panel 110 according to one embodiment of the present disclosure is characterized in that a plurality of touch lines TL and a plurality of first signal lines SL1 are disposed in a middle area of a pixel P.

In detail, the transparent display panel 110 according to one embodiment of the present disclosure may include a pixel P provided between adjacent transmissive areas TA. The pixel P may include light emission areas EA1, EA2, EA3 and EA4 in which light emitting elements are disposed to emit light. In the transparent display panel 110, since a size of the non-transmissive area is small, the circuit element may be disposed to at least partially overlap the light emission areas EA1, EA2, EA3 and EA4. That is, the light emission areas EA1, EA2, EA3 and EA4 may include circuit areas CA1, CA2, CA3 and CA4 in which circuit elements are disposed.

For example, the circuit areas may include a first circuit area CA1 in which a circuit element connected to the first subpixel SP1 is disposed, a second circuit area CA2 in which a circuit element connected to the second subpixel SP2 is disposed, a third circuit area CA3 in which a circuit element connected to the third subpixel SP3 is disposed, and a fourth circuit area CA4 in which a circuit element connected to the fourth subpixel SP4 is disposed.

The first to fourth circuit areas CA1, CA2, CA3 and CA4 may be spaced apart from each other with the first signal line area SLA1 or the second signal line area SLA2, which is interposed therebetween.

For example, the first circuit area CA1 and the second circuit area CA2 may be disposed to be spaced apart from each other with the first signal line area SLA1 interposed therebetween, and the first circuit area CA1 and the third circuit area CA3 may be disposed to be spaced apart from each other with the second signal line area SLA2 interposed therebetween. In addition, the third circuit area CA3 and the fourth circuit area CA4 may be disposed to be spaced apart from each other with the first signal line area SLA1 interposed therebetween, and the second circuit area CA2 and the fourth circuit area CA4 may be disposed to be spaced apart from each other with the second signal line area SLA2 interposed therebetween.

In the transparent display panel 110 according to one embodiment of the present disclosure, the first signal line area SLA1 in which a plurality of touch lines TL and a plurality of first signal lines SL1 are disposed may be formed in the middle area of the pixel P, and the circuit areas CA1, CA2, CA3 and CA4 may be formed between the first signal line area SLA1 and the transmissive area TA.

In the transparent display panel 110 according to one embodiment of the present disclosure, the touch lines TL do not overlap the circuit areas CA1, CA2, CA3 and CA4, whereby parasitic capacitance of the touch lines TL due to the circuit elements may be minimized or reduced.

Furthermore, the transparent display panel 110 according to one embodiment of the present disclosure may minimize or reduce a horizontal distance difference between the touch lines TL. Since at least two transistors and a capacitor are disposed in the circuit areas CA1, CA2, CA3 and CA4, it may be difficult to dispose the touch lines TL to have a predetermined or selected horizontal distance in the circuit areas CA1, CA2, CA3 and CA4. Therefore, when the touch lines TL are disposed in the circuit areas CA1, CA2, CA3 and CA4, the horizontal distance difference between the touch lines TL is increased, whereby uniformity of the parasitic capacitance may be very low.

In the transparent display panel 110 according to one embodiment of the present disclosure, the touch lines TL are disposed so as not to overlap the circuit areas CA1, CA2, CA3 and CA4 in the middle area of the pixel P, whereby an influence of the circuit element may be reduced and at the same time the horizontal distance difference between the touch lines TL may be reduced to improve uniformity of the parasitic capacitance.

In the transparent display panel 110 according to one embodiment of the present disclosure, a plurality of first signal lines SL1 may be disposed in the middle area of the pixel P in addition to the touch lines TL, and the first signal lines SL1 may affect the parasitic capacitance of the touch lines TL. The transparent display panel 110 according to one embodiment of the present disclosure is characterized in that the plurality of first signal lines SL1 are disposed in a layer different from the touch lines TL alternately with the touch lines TL to make sure of a sufficient spaced distance between the first signal lines SL1 and the touch lines TL.

Hereinafter, an example in which the first signal lines SL1 and the touch lines TL are disposed in a vertical cross-sectional view will be described in detail with reference to FIGS. 7 and 8.

Figure 7:
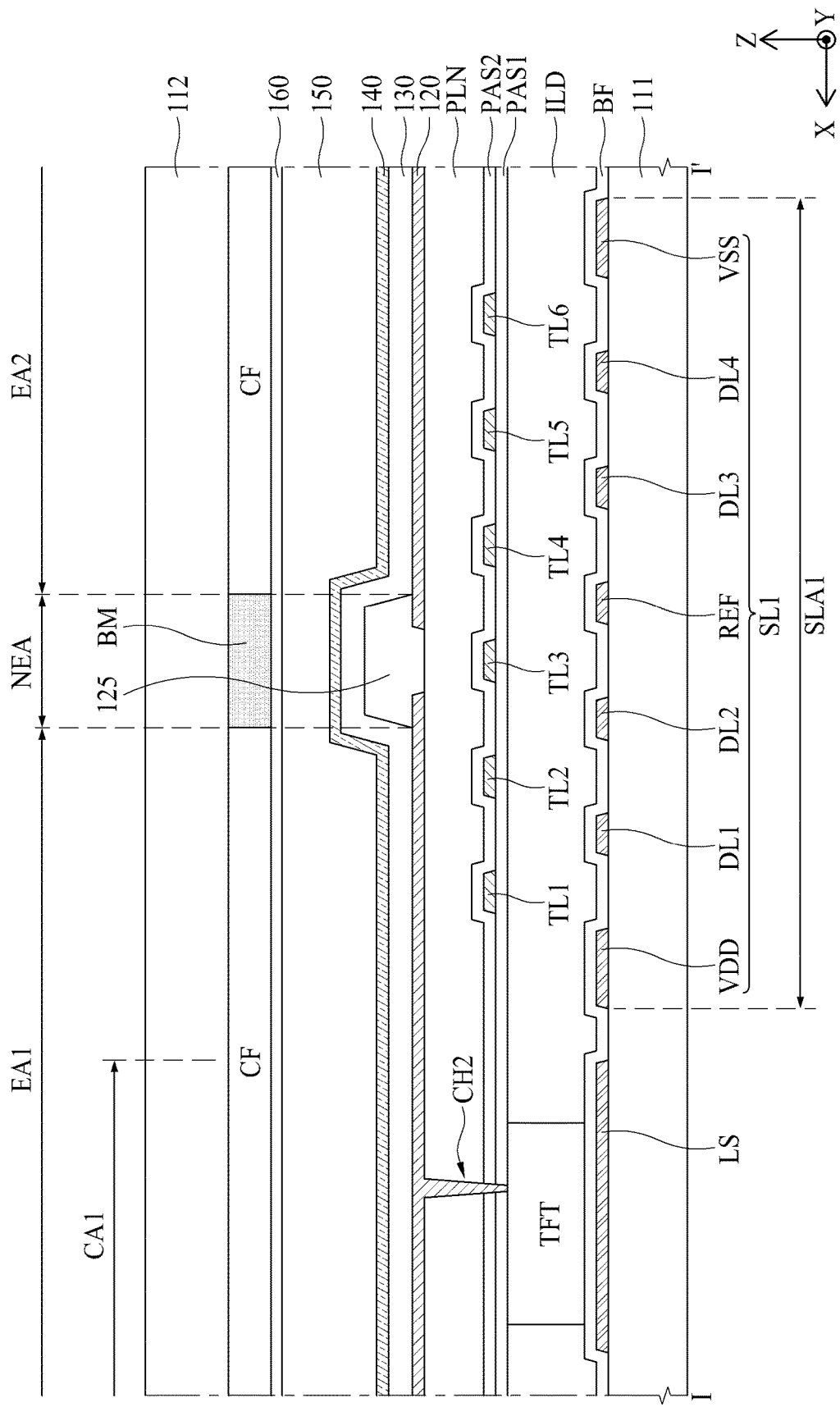
FIG. 7 is a cross-sectional view illustrating an example of I-I' of FIG. 4.
Figure 8:
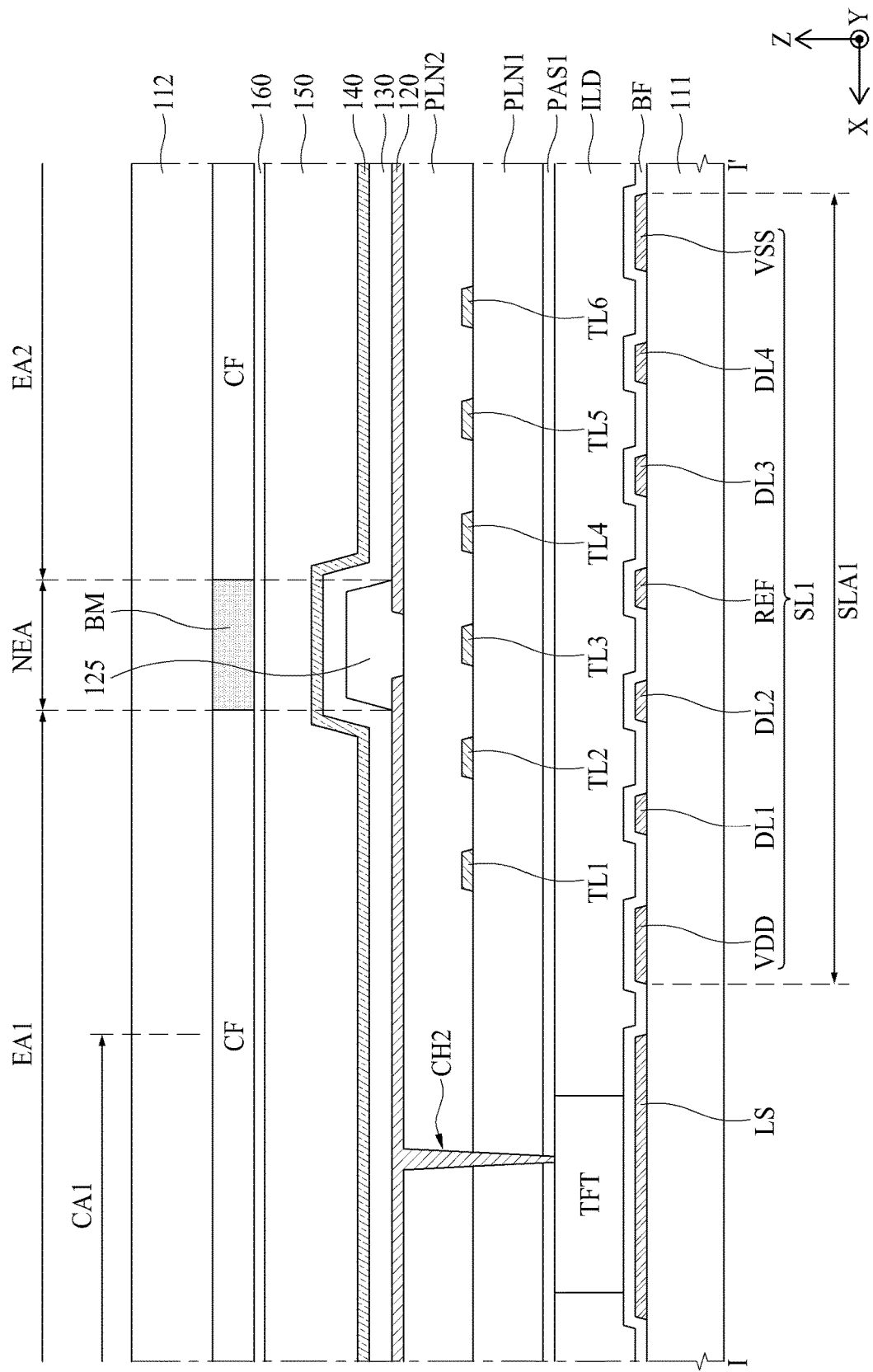
FIG. 8 is a cross-sectional view illustrating another example of I-I' of FIG. 4.

FIG. 7 is a cross-sectional view illustrating an example of I-I' of FIG. 4, and FIG. 8 is a cross-sectional view illustrating another example of I-I' of FIG. 4.

Referring to FIGS. 4, 7 and 8, the pixel P includes a first subpixel SP1, a second subpixel SP2, a third subpixel SP3 and a fourth subpixel SP4, and each of the plurality of subpixels SP1, SP2, SP3 and SP4 may include a circuit element, which includes at least one transistor and a capacitor, and a light emitting element.

The at least one transistor may include a driving transistor TFT, a switching transistor, and a sensing transistor.

The switching transistor is switched in accordance with a scan signal supplied to a scan line to charge a data voltage, which is supplied from the data line, in the capacitor.

The sensing transistor serves to sense a threshold voltage deviation of the driving transistor TFT, which causes deterioration of image quality, in accordance with a sensing signal.

The driving transistor TFT is switched in accordance with the data voltage charged in the capacitor to generate a data current from a power source supplied from the pixel power line VDD, thereby supplying the data current to a first electrode 120 of the subpixels SP1, SP2, SP3 and SP4.

Although not shown in detail in FIGS. 7 and 8, the driving transistor TFT may include an active layer, a gate electrode, a source electrode and a drain electrode. In detail, a light shielding layer LS may be provided over a first substrate 111. The light shielding layer LS serves to shield external light incident on the active layer in the area where the driving transistor TFT is formed. The light shielding layer LS may be formed of a single layer or multiple layers made of any one of molybdenum (Mo), aluminum (Al), chromium (Cr), gold (Au), titanium (Ti), nickel (Ni), neodymium (Nd) and copper (Cu) or their alloy.

As shown in FIG. 7, in the transparent display panel 110 according to one embodiment of the present disclosure, the first signal lines SL1 may be formed in the same layer as the light shielding layer LS. For example, the pixel power line VDD, the common power line VSS, the reference line REF and the data lines DL1, DL2, DL3 and DL4 may be formed of the same material in the same layer as the light shielding layer LS. In FIGS. 7 and 8, all of the pixel power line VDD, the common power line VSS, the reference line REF and the data lines DL1, DL2, DL3 and DL4 are shown as being formed in the same layer as the light shielding layer LS, but are not limited thereto. In another embodiment, a portion of the pixel power line VDD, the common power line VSS, the reference line REF and the data lines DL1, DL2, DL3 and DL4 may be formed in the same layer as the light shielding layer LS, and the other portion thereof may be formed in a different layer, for example, in the same layer as the gate electrode or the source electrode and the drain electrode.

A buffer layer BF may be provided over the light shielding layer LS and the first signal lines SL1. The buffer layer BF is for protecting the transistors TFT from water permeated through the first substrate 111 vulnerable to moisture permeation, and may be formed of an inorganic layer, for example, a silicon oxide layer (SiOx), a silicon nitride layer (SiNx), or multiple layers of SiOx and SiNx.

The active layer may be provided over the buffer layer BF. The active layer may be formed of a silicon-based semiconductor material or an oxide-based semiconductor material. A gate insulating layer may be provided over the active layer. The gate insulating layer may be formed of an inorganic layer, for example, a silicon oxide layer (SiOx), a silicon nitride layer (SiNx), or multiple layers of SiOx and SiNx. A gate electrode may be provided over the gate insulating layer. The gate electrode may be formed of a single layer or multiple layers made of one of molybdenum (Mo), aluminum (Al), chromium (Cr), gold (Au), titanium (Ti), nickel (Ni), neodymium (Nd) and copper (Cu), or their alloy.

An interlayer dielectric layer may be provided over the gate electrode. The interlayer dielectric layer may be formed of an inorganic layer, for example, a silicon oxide layer (SiOx), a silicon nitride layer (SiNx), or multiple layers of SiOx and SiNx. The source electrode and the drain electrode may be provided over the interlayer dielectric layer. The source electrode and the drain electrode may be connected to the active layer through a contact hole that passes through the gate insulating layer and the interlayer dielectric layer. The source electrode and the drain electrode may be formed of a single layer or multiple layers made of one of molybdenum (Mo), aluminum (Al), chromium (Cr), gold (Au), titanium (Ti), nickel (Ni), neodymium (Nd) and copper (Cu), or their alloy.

A first passivation layer PAS1 for insulating the driving transistor TFT may be provided over the source electrode and the drain electrode. The first passivation layer PAS1 may be formed of an inorganic layer, for example, a silicon oxide layer (SiOx), a silicon nitride layer (SiNx), or multiple layers of SiOx and SiNx.

A plurality of touch lines TL1, TL2, TL3, TL4, TL5 and TL6 may be provided over the first passivation layer PAS1. At this time, each of the plurality of touch lines TL1, TL2, TL3, TL4, TL5 and TL6 may be formed to be disposed between the first signal lines SL1 on a plan view. The plurality of touch lines TL1, TL2, TL3, TL4, TL5 and TL6 may be formed of a single layer or multiple layers made of one of molybdenum (Mo), aluminum (Al), chromium (Cr), gold (Au), titanium (Ti), nickel (Ni), neodymium (Nd) and copper (Cu), or their alloy.

A second passivation layer PAS2 for insulating the plurality of touch lines TL1, TL2, TL3, TL4, TL5 and TL6 may be provided over the plurality of touch lines TL1, TL2, TL3, TL4, TL5 and TL6. The second passivation layer PAS2 may be formed of an inorganic layer, for example, a silicon oxide layer (SiOx), a silicon nitride layer (SiNx), or multiple layers of SiOx and SiNx. The second passivation layer PAS2 may be omitted.

A planarization layer PLN for planarizing a step difference due to the driving transistor TFT and the plurality of touch lines TL1, TL2, TL3, TL4, TL5 and TL6 may be provided over the second passivation layer PAS2. The planarization layer PLN may be formed of an organic layer such as an acrylic resin, an epoxy resin, a phenolic resin, a polyamide resin, and a polyimide resin.

In FIG. 7, the plurality of touch lines TL1, TL2, TL3, TL4, TL5 and TL6 are shown as being directly formed on the first passivation layer PAS1, but are not limited thereto. In another embodiment, a separate planarization layer may be further provided between the first passivation layer PAS1 and the plurality of touch lines TL1, TL2, TL3, TL4, TL5 and TL6 as shown in FIG. 8.

In detail, a first planarization layer PLN1 and a second planarization layer PLN2 may be provided between the first electrode 120 and the driving transistor TFT. The first planarization layer PLN1 may be disposed over the first passivation layer PAS1 to planarize a step difference due to the driving transistor TFT. The second planarization layer PLN2 may be disposed over the first planarization layer PLN1. In this structure, the plurality of touch lines TL1, TL2, TL3, TL4, TL5 and TL6 may be provided between the first planarization layer PLN1 and the second planarization layer PLN2 to increase a vertical distance with the first signal lines SL1.

A light emitting element, which is comprised of the first electrode 120, an organic light emitting layer 130 and the second electrode 140, and a bank 125 may be provided over the planarization layer PLN.

The first electrode 120 may be provided over the planarization layer PLN for each of the subpixels SP1, SP2, SP3 and SP4. The first electrode 120 is not provided in the transmissive area TA.

The first electrode 120 may be connected to the driving transistor TFT. In detail, the first electrode 120 may be connected to one of the source electrode and the drain electrode of the driving transistor TFT through a second contact hole CH2 that passes through the planarization layer PLN, the first passivation layer PAS1 and the second passivation layer PAS2.

The first electrode 120 may be formed of a metal material having high reflectance, such as a stacked structure (Ti/Al/Ti) of aluminum and titanium, a stacked structure (ITO/Al/ITO) of aluminum and ITO, an Ag alloy, a stacked structure (ITO/Ag alloy/ITO) of Ag alloy and ITO, a MoTi alloy, and a stacked structure (ITO/MoTi alloy/ITO) of MoTi alloy and ITO. The Ag alloy may be an alloy of silver (Ag), palladium (Pd), copper (Cu), etc. The MoTi alloy may be an alloy of molybdenum (Mo) and titanium (Ti). The first electrode 120 may be an anode electrode.

The bank 125 may be provided over the planarization layer PLN. The bank 125 may be provided to at least partially cover an edge of the first electrode 120 and expose a portion of the first electrode 120. Therefore, the bank 125 may prevent a problem in which light emitting efficiency is deteriorated due to concentration of a current on an end of the first electrode 120.

The bank 125 may define (e.g., laterally surround) light emission areas EA1, EA2, EA3 and EA4 of the subpixels SP1, SP2, SP3 and SP4. The light emission areas EA1, EA2, EA3 and EA4 of each of the subpixels SP1, SP2, SP3 and SP4 represent an area in which the first electrode 120, the light emitting layer 130 and the second electrode 140 are sequentially stacked and holes from the first electrode 120 and electrons from the second electrode 140 are combined with each other in the light emitting layer 130 to emit light. In this case, the area in which the bank 125 is provided may become the non-light emission area NEA because light is not emitted therefrom, and the area in which the bank 125 is not provided and the first electrode is exposed may become the light emission area EA.

The bank 125 may be formed of an organic layer such as an acrylic resin, an epoxy resin, a phenolic resin, a polyamide resin, and a polyimide resin.

The organic light emitting layer 130 may be disposed over the first electrode 120. The organic light emitting layer 130 may include a hole transporting layer, a light emitting layer and an electron transporting layer. In this case, when a voltage is applied to the first electrode 120 and the second electrode 140, holes and electrons move to the light emitting layer through the hole transporting layer and the electron transporting layer, respectively and are combined with each other in the light emitting layer to emit light.

In one embodiment, the organic light emitting layer 130 may be a common layer commonly provided in the subpixels SP1, SP2, SP3 and SP4. In this case, the light emitting layer may be a white light emitting layer for emitting white light.

In another embodiment, the light emitting layer of the organic light emitting layer 130 may be formed for each of the subpixels SP1, SP2, SP3 and SP4. For example, a green light emitting layer for emitting green light may be provided in the first subpixel SP1, a red light emitting layer for emitting red light may be provided in the second subpixel SP2, a blue light emitting layer for emitting blue light may be provided in the third subpixel SP3, and a white light emitting layer for emitting white light may be provided in the fourth subpixel SP4. In this case, the light emitting layer of the organic light emitting layer 130 is not provided in the transmissive area TA.

The second electrode 140 may be disposed over the organic light emitting layer 130 and the bank 125. The second electrode 140 provided in the non-transmissive area is a cathode electrode, and may be a common layer that is commonly formed in the subpixels SP1, SP2, SP3 and SP4 to apply the same voltage.

In one embodiment, a touch sensor electrode of the touch sensor may be formed of the same material as that of the cathode electrode of the light emitting element in the same layer as the cathode electrode of the light emitting element. In this case, the second electrode 140 may include a cathode electrode provided in the non-transmissive area and a touch sensor electrode provided in the transmissive area TA. In this case, the cathode electrode and the touch sensor electrode may be spaced apart from each other.

The second electrode 140 may be formed of a transparent conductive material (TCO) such as ITO and IZO, which may transmit light, or a semi-transmissive conductive material such as magnesium (Mg), silver (Ag) or an alloy of magnesium (Mg) and silver (Ag). When the second electrode 140 is formed of a semi-transmissive conductive material, light emitting efficiency may be increased by a micro cavity.

An encapsulation layer 150 may be provided over the light emitting elements. The encapsulation layer 150 may be formed on the second electrode 140 to cover the second electrode 140. Although not shown in detail, a touch sensor (not shown) may be provided in the transmissive area TA. In this case, the encapsulation layer 150 may be formed to cover the touch sensor as well as the second electrode 140.

The encapsulation layer 150 serves to prevent oxygen or water from being permeated into the organic light emitting layer 130, the second electrode 140 and the touch sensor. To this end, the encapsulation layer 150 may include at least one inorganic layer and at least one organic layer.

Meanwhile, although not shown in FIG. 7 and FIG. 8, a capping layer may additionally be provided between the second electrode 140 and the encapsulation layer 150.

A color filter CF may be provided over the encapsulation layer 150. The color filter CF may be provided over one surface of the second substrate 112 that faces the first substrate 111. In this case, the first substrate 111 provided with the encapsulation layer 150 and the second substrate 112 provided with the color filter CF may be bonded to each other by an adhesive layer 160. At this time, the adhesive layer 160 may be an optically clear resin (OCR) layer or an optically clear adhesive (OCA) film.

The color filter CF may be provided to be patterned for each of the subpixels SP1, SP2, SP3 and SP4. In detail, the color filter CF may include a first color filter, a second color filter, and a third color filter. The first color filter may be disposed to correspond to the emission area EA1 of the first subpixel SP1, and may be a green color filter that transmits green light. The second color filter may be disposed to correspond to the emission area EA2 of the second subpixel SP2, and may be a red color filter that transmits red light. The third color filter may be disposed to correspond to the emission area EA3 of the third subpixel SP3, and may be a blue color filter that transmits blue light.

The transparent display panel 110 according to one embodiment of the present disclosure is characterized in that a polarizer is not used, and the color filter CF is formed in the second substrate 112. If the polarizer is attached to the transparent display panel 110, transmittance of the transparent display panel 110 is reduced by the polarizer. Meanwhile, if the polarizer is not attached to the transparent display panel 110, a problem occurs in that externally incident light is reflected towards the electrodes.

A black matrix BM may be provided between color filters CF. The black matrix BM may be disposed between the subpixels SP1, SP2, SP3 and SP4 to prevent a color mixture from occurring between adjacent subpixels SP1, SP2, SP3 and SP4. In addition, the black matrix BM may prevent externally incident light from being reflected toward a plurality of lines provided among the subpixels P1, P2 and P3, for example, the gate lines, the data lines, the pixel power lines, the common power lines, the reference lines, etc.

In the transparent display panel 110 according to one embodiment of the present disclosure, the first signal lines SL1 may be formed in the same layer as the light shielding layer LS, whereby the vertical distance between the first signal lines SL1 and the touch lines TL may be increased. A plurality of insulating layers, such as a buffer layer BF, an insulating layer that includes a gate insulating layer and an interlayer dielectric layer, and a first passivation layer PAS1, may be provided between the first signal lines SL1 and the touch lines TL. Therefore, the transparent display panel 110 according to one embodiment of the present disclosure may reduce parasitic capacitance of the touch lines TL due to the first signal lines SL1.

In addition, in the transparent display panel 110 according to one embodiment of the present disclosure, the first signal lines SL1 and the touch lines TL may be alternately disposed, whereby the spaced distance between the first signal lines SL1 and the touch lines TL may be increased. Therefore, the transparent display panel 110 according to one embodiment of the present disclosure may minimize or reduce the parasitic capacitance of the touch lines TL, which is caused by the first signal lines SL1. Furthermore, the transparent display panel 110 according to one embodiment of the present disclosure may minimize or reduce an average value of the parasitic capacitance of the touch lines TL.

Meanwhile, in the transparent display panel 110 according to one embodiment of the present disclosure, the touch lines TL may be disposed below the light emitting element, whereby light emitting efficiency of the pixel P may be prevented from being deteriorated due to the touch lines TL.

In the transparent display panel 110 according to one embodiment of the present disclosure, even though the touch lines TL are disposed below the light emitting element, since the first signal lines SL1 are provided in the light shielding layer LS and are alternately disposed with the touch lines TL, a sufficient spaced distance between the first signal lines SL1 and the touch lines TL may be ensured.

Also, in the transparent display panel 110 according to one embodiment of the present disclosure, as described above, since the touch lines TL are disposed so as not to overlap the circuit areas CA1, CA2, CA3 and CA4 in the middle area of the pixel P, an influence due to the circuit element may be minimized or reduced, and at the same time uniformity of the parasitic capacitance may be improved.

Referring back to FIG. 4, the second signal line area SLA2 is extended from the display area DA in the second direction (X-axis direction), and at least a portion thereof may be disposed to overlap the light emission areas EA1, EA2, EA3 and EA4. A plurality of second signal line areas SLA2 may be provided in the transparent display panel 110, and the transmissive area TA may be provided between two adjacent second signal line areas SLA2. A second signal line SL2 extended in the second direction (X-axis direction) and a bridge line BL extended in the second direction (X-axis direction) may be disposed to be spaced apart from each other in the second signal line area SLA2.

The second signal line SL2 may include, for example, a scan line SCANL. The scan line SCANL may supply a scan signal to the subpixels SP1, SP2, SP3 and SP4 of the pixel P.

The bridge line BL may connect any one of the plurality of touch lines TL with the plurality of touch sensors TS. In detail, the bridge line BL may be connected to any one of the plurality of touch lines TL through a first contact hole CH2. The bridge line BL may be connected to each of the plurality of touch sensors arranged in the second direction (X-axis direction) while being extended in the second direction (X-axis direction). Therefore, all of the touch sensors connected to one bridge line BL may be connected to the touch line TL connected through the first contact hole CH1.

In the transparent display panel 110 according to one embodiment of the present disclosure, the plurality of touch lines TL may be disposed in the first signal line area SLA1 not the second signal line area SLA2, whereby light transmittance may be prevented from being deteriorated due to the plurality of touch lines TL. The second signal line area SLA2 extended in the second direction (X-axis direction) crosses between the transmissive areas TA disposed to be adjacent to each other as shown in FIG. 4. When a width of the second signal line area SLA2 crossing the transmissive areas TA is increased, a size of the transmissive area TA has no option but to be reduced.

When the plurality of touch lines TL are disposed in the second signal line area SLA2, the width of the second signal line area SLA2 is increased to dispose a large number of lines, and the size of the transmissive area TA is reduced. That is, a problem may occur in that light transmittance of the transparent display panel 110 is reduced due to the plurality of touch lines TL.

In the transparent display panel 110 according to one embodiment of the present disclosure, the plurality of touch lines TL are disposed in the first signal line area SLA1, and only one bridge line BL for connecting the plurality of touch sensors is provided in the second signal line area SLA2. Therefore, the transparent display panel 110 according to one embodiment of the present disclosure may prevent the size of the transmissive area TA or light transmittance from being reduced due to the plurality of touch lines TL.

Figure 9:
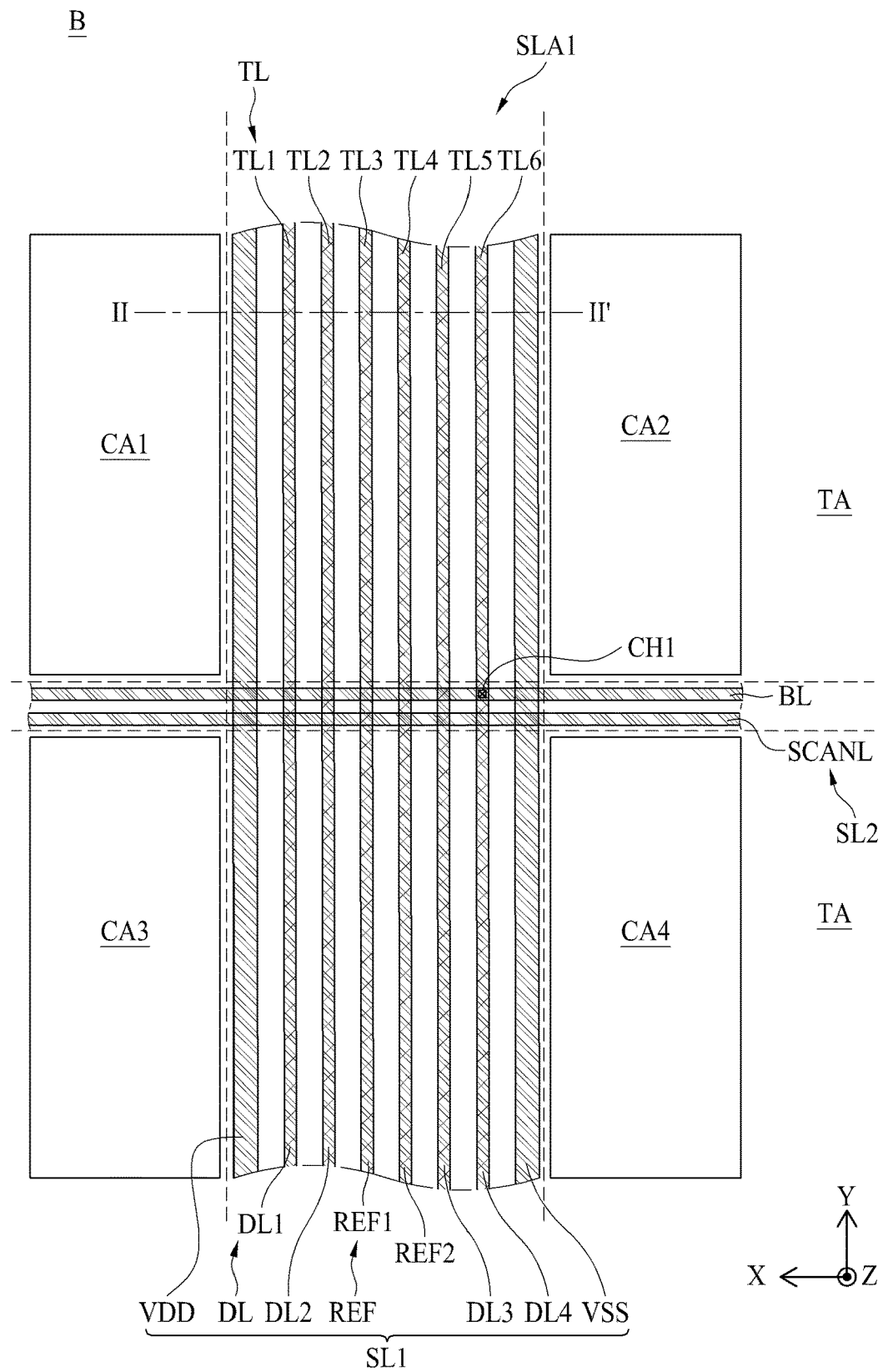
FIG. 9 is a view illustrating another example of signal lines and touch lines, which are provided in an area B of FIG. 3.
Figure 10:
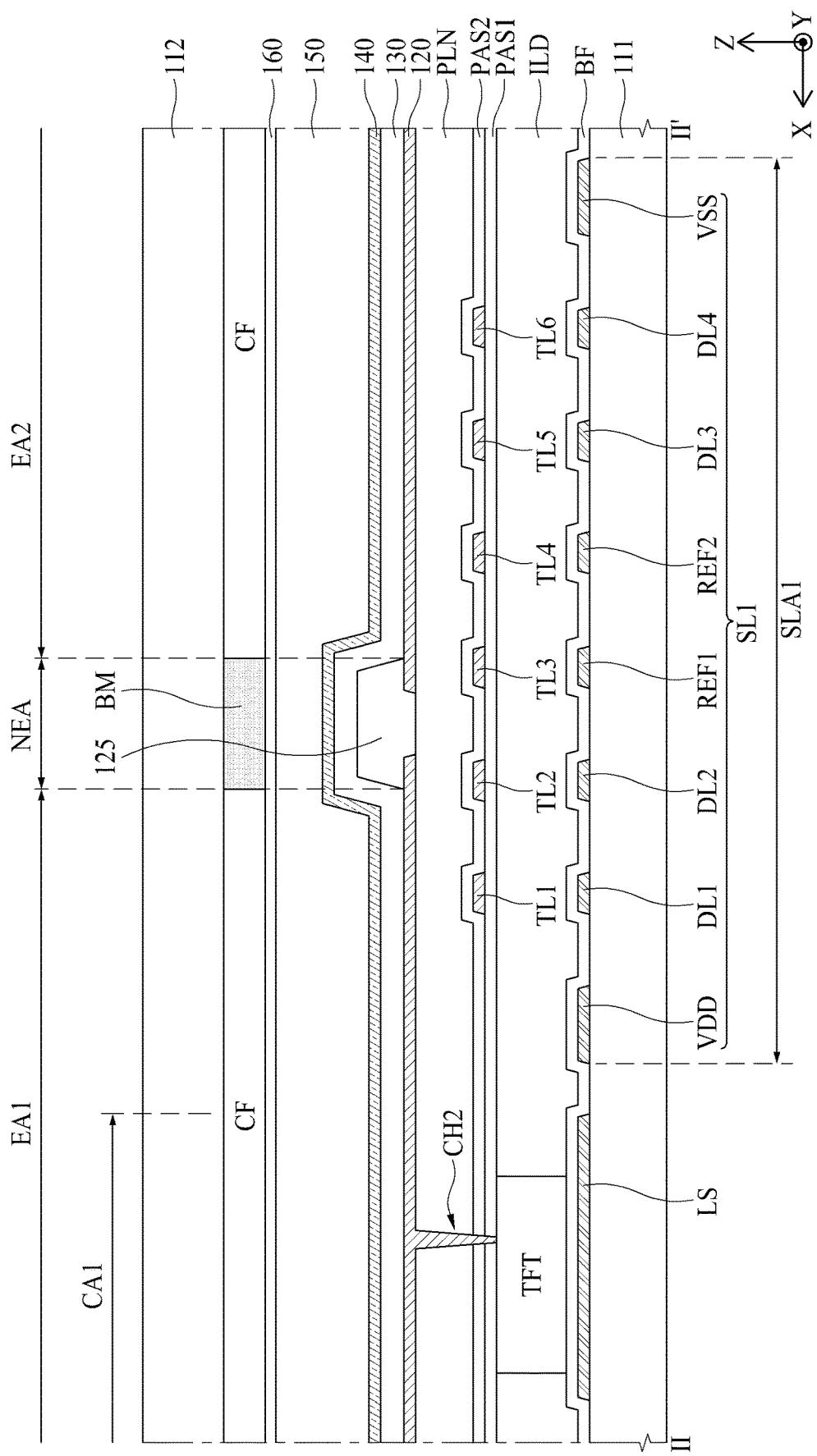
FIG. 10 is a cross-sectional view illustrating an example of II-II' of FIG. 9.
Figure 11:
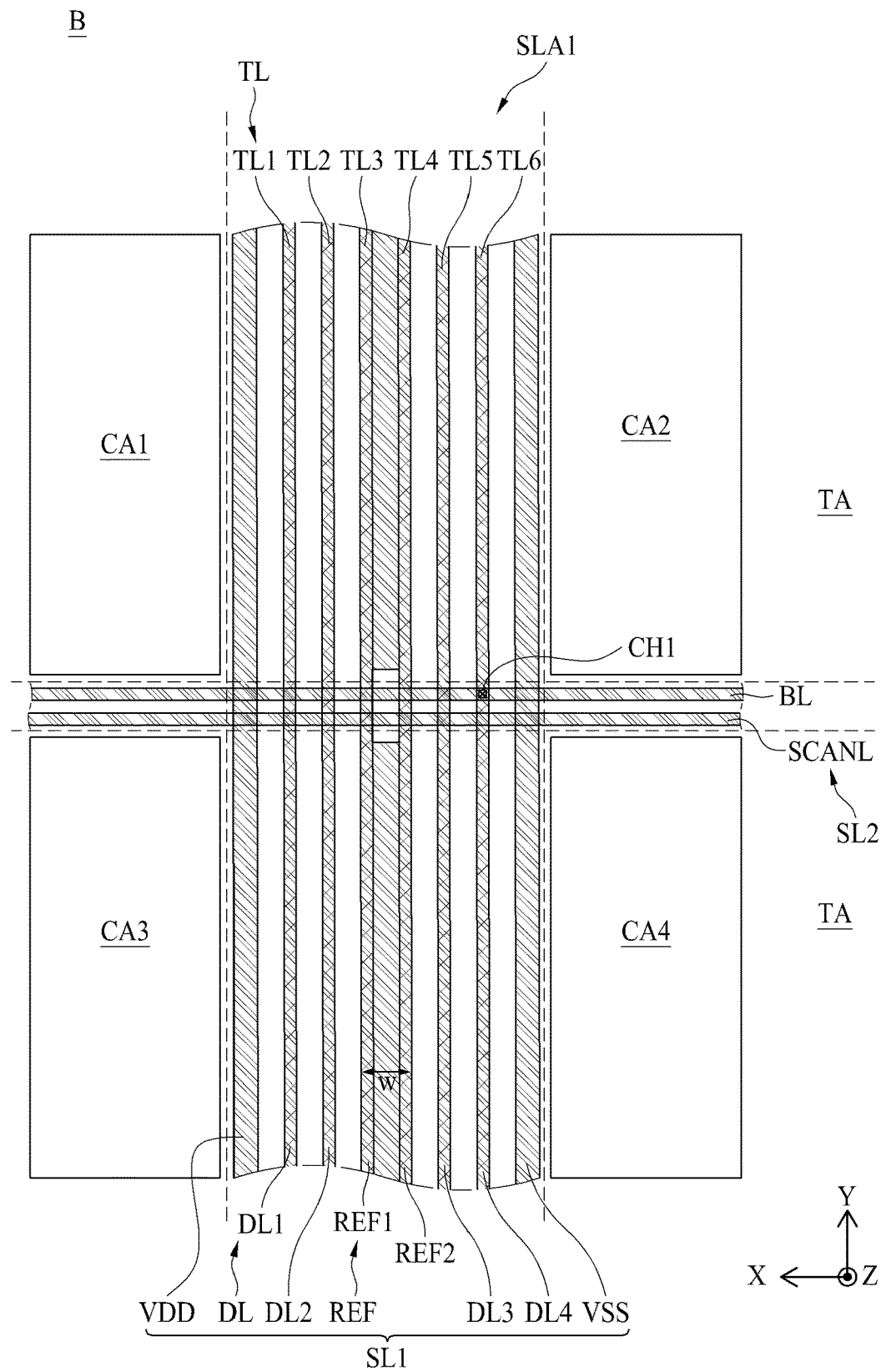
FIG. 11 is a view illustrating a modified example of FIG. 9.
Figure 12:
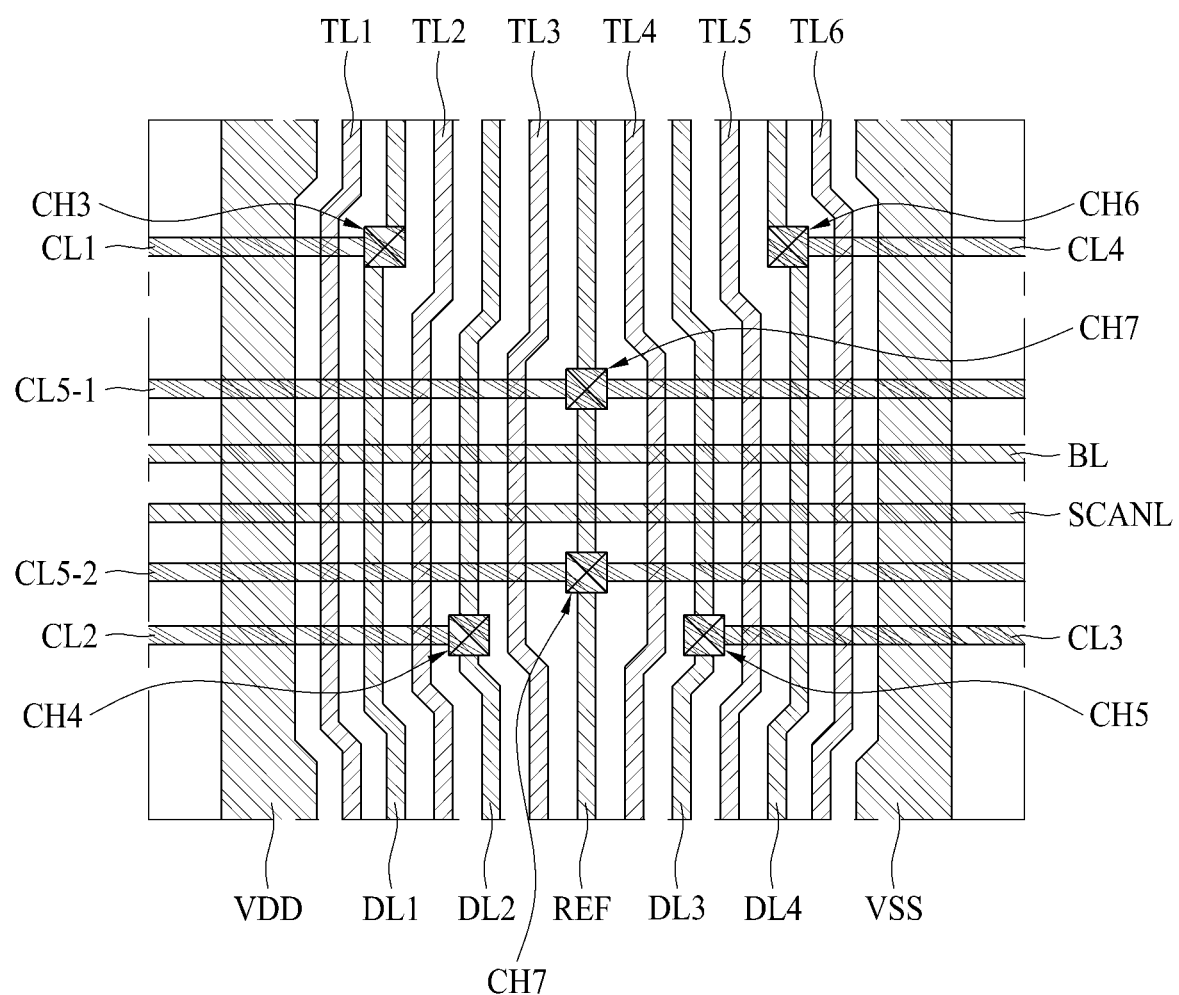
FIG. 12 is a detailed view illustrating an example of signal lines and touch lines of FIG. 4, which are disposed in an overlap area.
Figure 13:
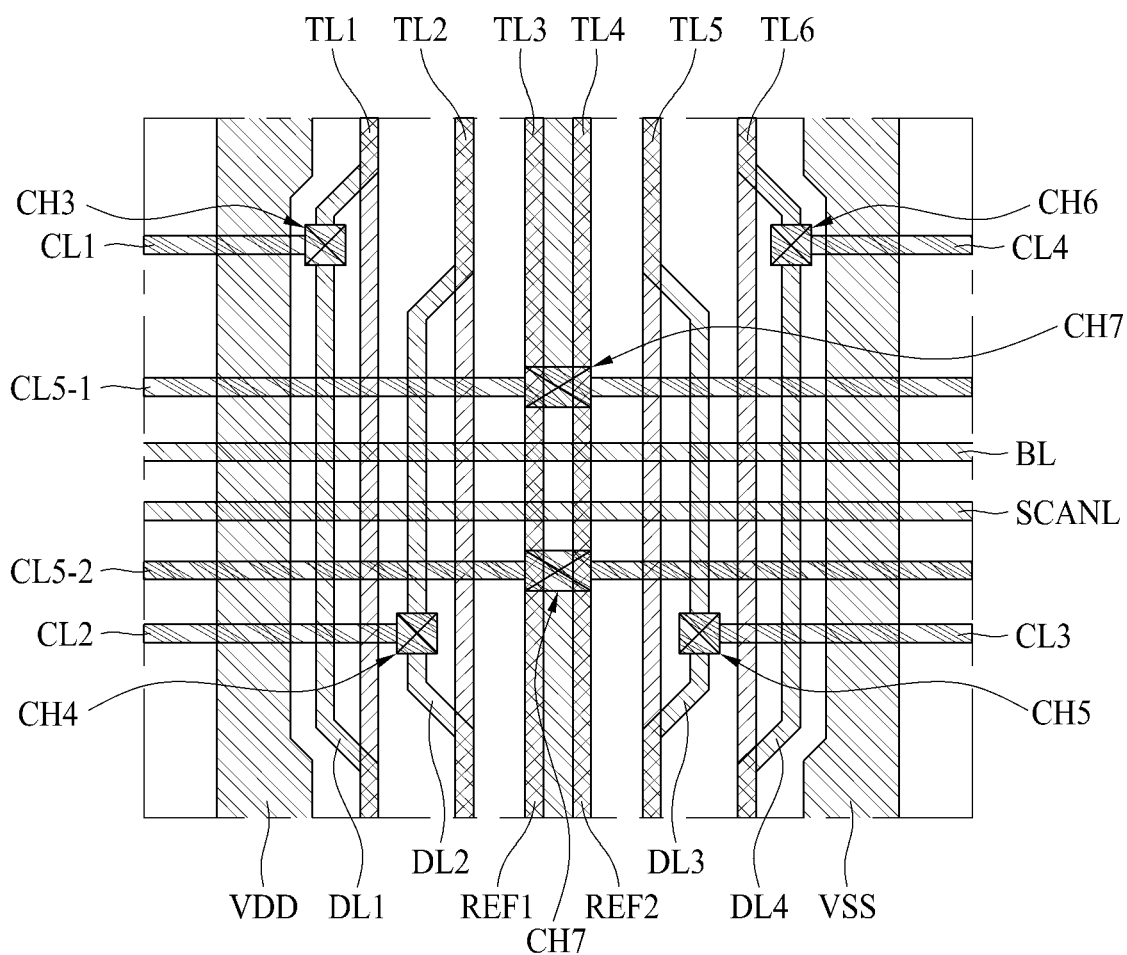
FIG. 13 is a detailed view illustrating an example of signal lines and touch lines of FIG. 9, which are disposed in an overlap area.

FIG. 9 is a view illustrating another example of signal lines and touch lines, which are provided in an area B of FIG. 3, FIG. 10 is a cross-sectional view illustrating an example of II-II' of FIG. 9, and FIG. 11 is a view illustrating a modified example of FIG. 9. FIG. 12 is a detailed view illustrating an example of signal lines and touch lines of FIG. 4, which are disposed in an overlap area, and FIG. 13 is a detailed view illustrating an example of signal lines and touch lines of FIG. 9, which are disposed in an overlap area.

The transparent display panel 110 shown in FIGS. 9 to 11 is different from the transparent display panel 110 shown in FIGS. 4, 7 and 8 in that the first signal lines SL1 at least partially overlap the touch lines TL.

The following description will be made based on a difference from the transparent display panel 110 shown in FIGS. 4, 7 and 8, and a detailed description of the same elements substantially the same as those of the transparent display panel 110 shown in FIGS. 4, 7 and 8 will be omitted.

Referring to FIGS. 9 to 13, the transparent display panel 110 includes a transmissive area TA and a non-transmissive area, wherein the non-transmissive area may include a first signal line area SLA1, a second signal line area SLA2 and a pixel P.

The pixels P are provided in an overlap area where the first signal line area SLA1 and the second signal line area SLA2 cross each other, and displays an image by emitting light. A light emission area EA may correspond to the area in which light is emitted in the pixel P.

The first signal line area SLA1 may be extended from the display area DA in the first direction (Y-axis direction), and at least a portion thereof may be disposed to overlap the light emission areas EA1, EA2, EA3 and EA4. The transparent display panel 110 may be provided with a plurality of first signal line areas SLA1, and the transmissive area TA may be provided between two adjacent first signal line areas SLA1. A first signal line SL1 extended in the first direction (Y-axis direction) and a touch line TL extended in the first direction (Y-axis direction) may be disposed to be spaced apart from each other in the first signal line area SLA1.

The first signal line SL1 may be provided as a plurality of first signal lines SL1, and may include at least one of a pixel power line VDD, a common power line VSS, a reference line REF or a data line DL.

The pixel power line VDD and the common power line VSS may be disposed outside the plurality of data lines DL1, DL2, DL3 and DL4. For example, the pixel power line VDD may be disposed outside the first data line DL1 provided at the leftmost of the plurality of data lines DL1, DL2, DL3 and DL4, and the common power line VSS may be disposed outside the fourth data line DL4 provided at the rightmost of the plurality of data lines DL1, DL2, DL3 and DL4.

The reference line REF may include a first reference line REF1 and a second reference line REF2, and the first and second reference lines REF1 and REF2 may be disposed between the plurality of data lines DL1, DL2, DL3 and DL4. For example, the first and second reference lines REF1 and REF2 may be disposed at the center of the plurality of data lines DL1, DL2, DL3 and DL4, that is, between the third data line DL3 and the fourth data line DL4.

The first and second reference lines REF1 and REF2 may be diverged from an area at least partially overlapped with the pixel P and thus connected to the plurality of subpixels SP1, SP2, SP3 and SP4. In detail, the first and second reference lines REF1 and REF2 may be connected to the circuit elements of the plurality of subpixels SP1, SP2, SP3 and SP4 to supply a reference signal to each of the subpixels SP1, SP2, SP3 and SP4.

When the first and second reference lines REF1 and REF2 are disposed outside the first signal line area SLA1, a deviation between connection lengths from the diverged point to the circuit element of each of the plurality of subpixels SP1, SP2, SP3 and SP4 is increased. For example, when the first and second reference lines REF1 and REF2 are disposed at the leftmost side of the area in which the first signal line area SLA1 is formed, the connection length from the diverged point to the circuit element disposed over a right side of the first signal line area SLA1 may be greater than the connection length from the diverged point to the circuit element disposed over a left side of the first signal line area SLA1. In this case, a difference between the signal supplied to the circuit area disposed over the right side of the first signal line area SLA1 and the signal supplied to the circuit area disposed over the left side of the first signal line area SLA1 may occur.

In the transparent display panel 110 according to one embodiment of the present disclosure, the first and second reference lines REF1 and REF2 are disposed between the plurality of data lines DL1, DL2, DL3 and DL4, whereby the deviation between the connection lengths to the circuit elements of the respective subpixels SP1, SP2, SP3 and SP4 may be minimized or reduced. Therefore, the first and second reference lines REF1 and REF2 may uniformly supply signals to the circuit element of each of the plurality of subpixels SP1, SP2, SP3 and SP4.

Each of the data lines DL1, DL2, DL3 and DL4 may supply a data voltage to at least one of the subpixels SP1, SP2, SP3 and SP4. For example, the first data line DL1 may supply a first data voltage to the first driving transistor TFT of the first subpixel SP1, the second data line DL2 may supply a second data voltage to the second driving transistor TFT of the second subpixel SP2, the third data line DL3 may supply a third data voltage to the third driving transistor TFT of the third subpixel SP3, and the fourth data line DL4 may supply a fourth data voltage to the fourth driving transistor TFT of the fourth subpixel SP4.

In the transparent display panel 110 according to another embodiment of the present disclosure, the touch line TL may be further disposed in the first signal line area SLA1.

At least two touch lines TL may be provided in the first signal line area SLA1. The plurality of touch lines TL may be provided as shown in FIGS. 9 and 10 and disposed to at least partially overlap the plurality of first signal lines SL1.

For example, the touch line TL may include six touch lines TL1, TL2, TL3, TL4, TL5 and TL6. The first touch line TL1 may be disposed over the first data line DL1 to overlap at least a portion of the first data line DL1, the second touch line TL2 may be disposed over the second data line DL2 to overlap at least a portion of the second data line DL2, and the third touch line TL3 may be disposed over the first reference line REF1 to overlap at least a portion of the first reference line REF1. The fourth touch line TL4 may be disposed over the second reference line REF2 to overlap at least a portion of the second reference line REF2, the fifth touch line TL5 may be disposed over the third data line DL3 to overlap at least a portion of the third data line DL3, and the sixth touch line TL6 may be disposed over the fourth data line DL4 to overlap at least a portion of the fourth data line DL4. However, the touch lines are not limited to the above example.

In the transparent display panel 110 according to another embodiment of the present disclosure, the touch lines TL may be disposed to at least partially overlap the first signal lines SL1, whereby a horizontal distance between adjacent lines may be increased. Therefore, the transparent display panel 110 according to another embodiment of the present disclosure may reduce parasitic capacitance between the adjacent lines.

Also, in the transparent display panel 110 according to another embodiment of the present disclosure, the touch lines TL may be formed in a straight line.

In detail, in the transparent display panel 110 shown in FIG. 4, the touch lines TL may be disposed alternately with the first signal lines SL1 and disposed so as not to overlap the first signal lines SL1. In this case, the touch lines TL are formed of a plurality of bent lines, as shown in FIG. 12, so as not to overlap the first signal lines SL1.

The first signal lines SL1 may transfer signals to the plurality of subpixels SP1, SP2, SP3 and SP4 through a connection line connected to at least one of the plurality of subpixels SP1, SP2, SP3 and SP4. In detail, the first data line DL1 may supply the first data voltage to the first subpixel SP1 using a first connection line CL1 connected through a third contact hole CH3, and the second data line DL2 may supply the second data voltage to the second subpixel SP2 using a second connection line CL2 connected through a fourth contact hole CH4. The third data line DL3 may supply the third data voltage to the third subpixel SP3 using a third connection line CL3 connected through a fifth contact hole CH5, and the fourth data line DL4 may supply the fourth data voltage to the fourth subpixel SP4 using a fourth connection line CL4 connected through a sixth contact hole CH6. Further, the reference line REF may supply a reference signal to the plurality of subpixels SP1, SP2, SP3 and SP4 using a (5-1)th connection line CL5-1 connected through one seventh contact hole CH7 and a (5-2)th connection line CL5-2 connected through another seventh contact hole CH7.

As described above, each of the first signal lines SL1 may be connected to the connection lines CL1, CL2, CL3, CL4, CL5-1 and CL5-2 through the contact holes CH3, CH4, CH5, CH6 and CH7 to supply signals to the plurality of subpixels SP1, SP2, SP3 and SP4. The contact holes CH3, CH4, CH5, CH5, CH6 and CH7 are disposed in an area where the first signal line area SLAM 1 and the second signal line area SLA2 cross each other in order to contact the connection lines CL1, CL2, CL3, CL4, CL5-1 and CL5-2 extended in the second direction (X-axis direction).

In order that the touch lines TL do not overlap the plurality of contact holes CH4, CH4, CH5, CH6 and CH7 as well as the first signal lines SL1, as shown in FIG. 12, the touch lines TL may have no option but to be comprised of a plurality of bent lines. In this way, when the touch lines TL are formed of bent lines, a horizontal distance between adjacent lines may be non-uniform. This may result in a deviation in parasitic capacitance between the touch lines TL.

On the other hand, in the transparent display panel 110 according to another embodiment of the present disclosure, at least a portion of the touch lines TL may be formed to overlap the first signal lines SL1. In the transparent display panel 110 according to another embodiment of the present disclosure, the touch lines TL may be formed in a straight line as shown in FIG. 13, whereby resistance of the touch lines TL may be reduced.

Also, in the transparent display panel 110 according to another embodiment of the present disclosure, a horizontal distance between adjacent lines may be uniformly maintained due to linearity of the touch lines TL. Therefore, the transparent display panel 110 according to another embodiment of the present disclosure may reduce a deviation in parasitic capacitance between the touch lines TL.

Further, in the transparent display panel 110 according to another embodiment of the present disclosure, the number of the first signal lines SL1 may be the same as the number of touch lines TL. For example, the touch lines TL may be six, and the first signal lines SL1 may include four data lines DL1, DL2, DL3 and DL4 and two reference lines REF1 and REF2. In this case, each of the touch lines TL may at least partially overlap each of the first signal lines SL1, and may be disposed so that the plurality of touch lines TL may be symmetrical to each other based on a central line between the two reference lines REF1 and REF2. Therefore, the transparent display panel 110 according to another embodiment of the present disclosure may improve uniformity of parasitic capacitance between the touch lines TL. In addition, as the transparent display panel 110 according to another embodiment of the present disclosure includes two reference lines REF, the size of the reference line REF may be increased, whereby resistance of the reference line REF may be reduced.

In FIG. 9, the first reference line REF1 and the second reference line REF2 are shown as being spaced apart from each other, but are not limited thereto. In another embodiment, the first reference line REF1 and the second reference line REF2 may be integrally formed as shown in FIG. 11. In detail, the first reference line REF1 and the second reference line REF2 may be connected to each other in an area except an overlap area where the first signal line area SLA1 and the second signal line area SLA2 cross each other. Therefore, the reference line REF may have a width W wider than that of the data line DL or the touch line TL, and its resistance may be reduced.

Also, in the transparent display panel 110 according to another embodiment of the present disclosure, the first signal line area in which the plurality of touch lines TL1 and the plurality of first signal lines SL1 are disposed may be formed in the middle area of the pixel P, and the circuit areas CA1, CA2, CA3 and CA4 may be formed between the first signal line area SLA1 and the transmissive area TA.

In addition, in the transparent display panel 110 according to another embodiment of the present disclosure, the touch lines TL may not overlap the circuit areas CA1, CA2, CA3 and CA4, whereby parasitic capacitance of the touch lines TL due to the circuit elements may be minimized or reduced.

Further, as shown in FIG. 10, in the transparent display panel 110 according to another embodiment of the present disclosure, the first signal lines SL1 may be formed in the same layer as the light shielding layer LS, whereby the vertical distance between the first signal lines SL1 and the touch lines TL may be increased. A plurality of insulating layers, such as a buffer layer BF, an insulating layer ILD including a gate insulating layer and an interlayer dielectric layer, and a passivation layer, may be provided between the first signal lines SL1 and the touch lines TL. Therefore, the transparent display panel 110 according to another embodiment of the present disclosure may reduce parasitic capacitance of the touch lines TL due to the first signal lines SL1.

Meanwhile, in the transparent display panel 110 according to another embodiment of the present disclosure, the touch lines TL may be disposed below the light emitting element, whereby light emitting efficiency of the pixel P may be prevented from being deteriorated due to the touch lines TL.

FIGS. 3, 4 and 9 illustrate that the pixel P and the transmissive area TA have a rectangular shape, but are not limited thereto. Hereinafter, an example of a plurality of touch lines TL disposed in a transparent display panel 110 including a pixel P and a transmissive area TA that are not rectangular in shape will be described with reference to FIGS. 14 to 16.

Figure 14:
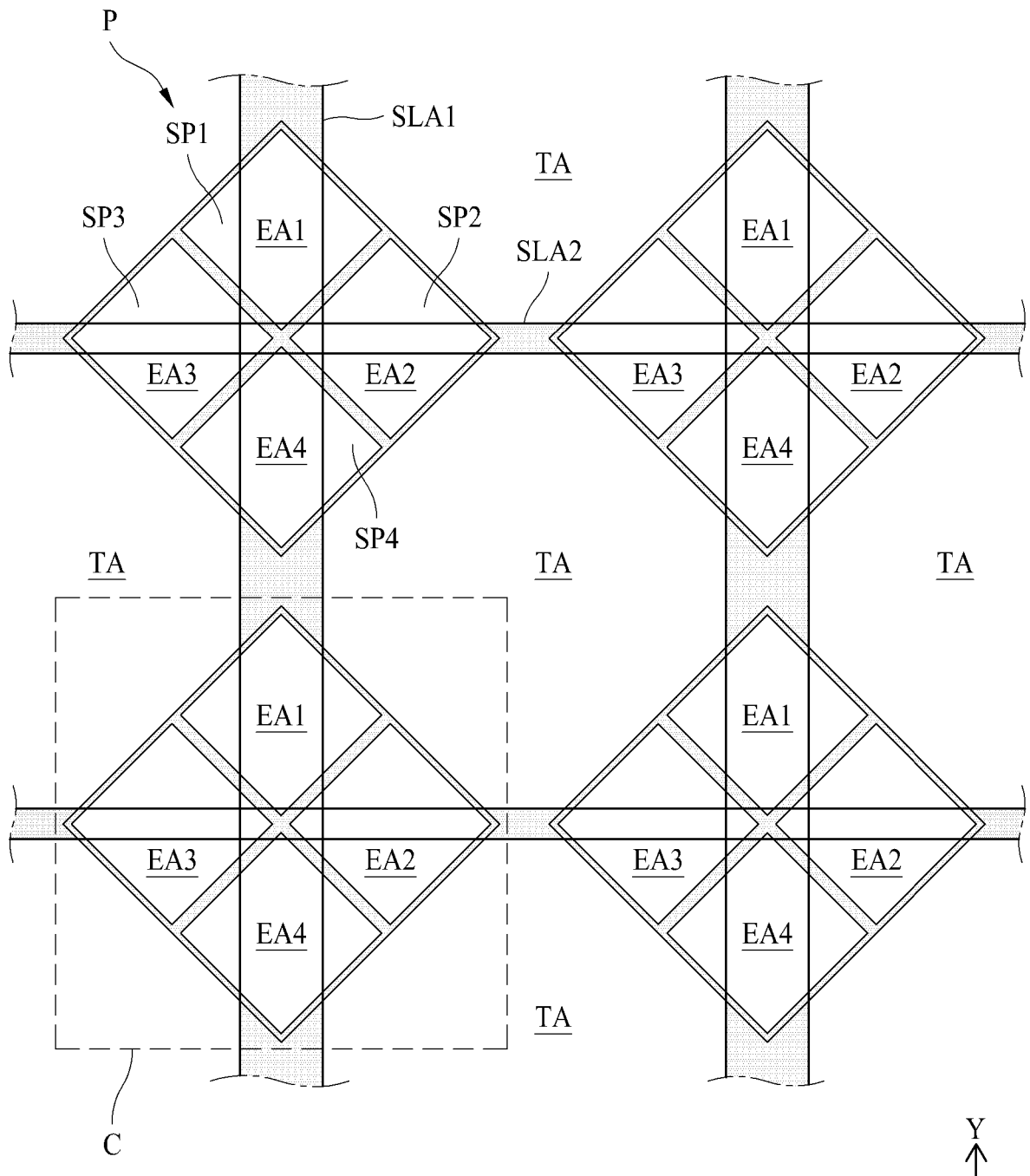
FIG. 14 is a schematic view illustrating another example of a pixel provided in an area A of FIG. 2.

FIG. 14 is a schematic view illustrating another example of a pixel provided in an area A of FIG. 2.

The transparent display panel 110 shown in FIG. 14 is different from the transparent display panel 110 shown in FIG. 3 in a shape of the pixel P and a shape of the transmissive area TA.

The following description will be made based on a difference from the transparent display panel 110 shown in FIG. 3, and a detailed description of the same elements substantially the same as those of the transparent display panel 110 shown in FIG. 3 will be omitted.

As shown in FIG. 14, the display area DA includes a transmissive area TA and a non-transmissive area, wherein the non-transmissive area may include a first signal line area SLA1, a second signal line area SLA2 and a pixel P.

Pixels P may include a light emission area EA which is provided in an overlap area where the first signal line area SL1 and the second signal line area SL2 cross each other and emits light to display an image.

As shown in FIG. 14, each of the pixels P may include a first subpixel SP1, a second subpixel SP2, a third subpixel SP3 and a fourth subpixel SP4. The first subpixel SP1 may include a first light emission area EA1 disposed to at least partially overlap the first signal line area SLA1, emitting light of a first color. The second subpixel SP2 may include a second light emission area EA2 disposed to at least partially overlap the second signal line area SLA2, emitting light of a second color. The third subpixel SP3 may include a third light emission area EA3 disposed to face the second subpixel SP2 based on the overlap area, emitting light of a third color. The fourth subpixel SP4 may include a fourth light emission area EA4 disposed to face the first subpixel SP1 based on the overlap area, emitting light of a fourth color.

For example, all of the first to fourth light emission areas EA1, EA2, EA3 and EA4 may emit light of their respective colors different from one another. For example, the first light emission area EA1 may emit green light, and the second light emission area EA2 may emit red light. The third light emission area EA3 may emit blue light, and the fourth light emission area EA4 may emit white light. However, the light emission areas are not limited to the above example.

For another example, at least two of the first to fourth light emission areas EA1, EA2, EA3 and EA4 may emit light of the same color. For example, the first light emission area EA1 and the second light emission area EA2 may emit green light, the third light emission area EA3 may emit red light, and the fourth light emission area EA4 may emit blue light. However, the light emission areas are not limited to the above example.

In addition, various modifications may be made in the arrangement order of the respective subpixels SP1, SP2, SP3 and SP4.

In the transparent display panel 110 according to another embodiment of the present disclosure, the pixel includes a plurality of sides facing the transmissive area TA, wherein each of the plurality of sides of the pixel P may have a slope with respect to each of the first signal line area SLA1 and the second signal line area SLA2. For example, the pixel P may have a rhombus shape as shown in FIG. 14, and the plurality of subpixels SP1, SP2, SP3 and SP4 included in the pixel P may also have a rhombus shape. In this case, the transmissive area TA may have a rhombus shape, a hexagonal shape or an octagonal shape depending on the size and arrangement of the pixel P.

Figure 15:
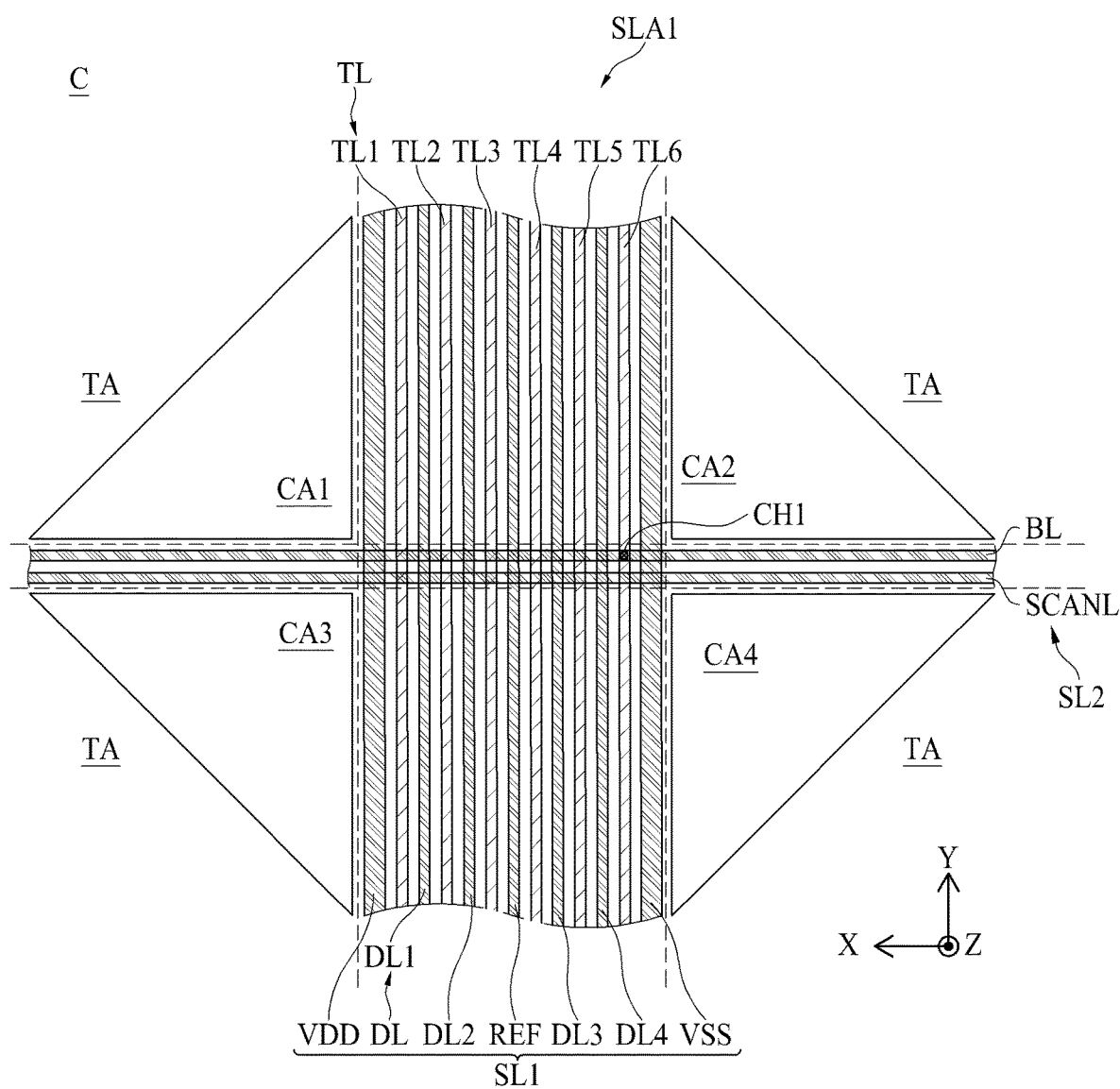
FIG. 15 is a view illustrating an example of signal lines and touch lines, which are provided in an area C of FIG. 14.

The signal lines SL1 and the touch lines TL, which are shown in FIGS. 4, 7 and 8, may be applied to the transparent display panel 110 provided with the pixels P having a rhombus shape. FIG. 15 is a view illustrating an example of signal lines and touch lines, which are provided in an area C of FIG. 14, and shows an example in which the signal lines SL1 and the touch lines TL, which are shown in FIGS. 4, 7 and 8, are applied to the transparent display panel 110 provided with the pixels P having a rhombus shape.

Figure 16:
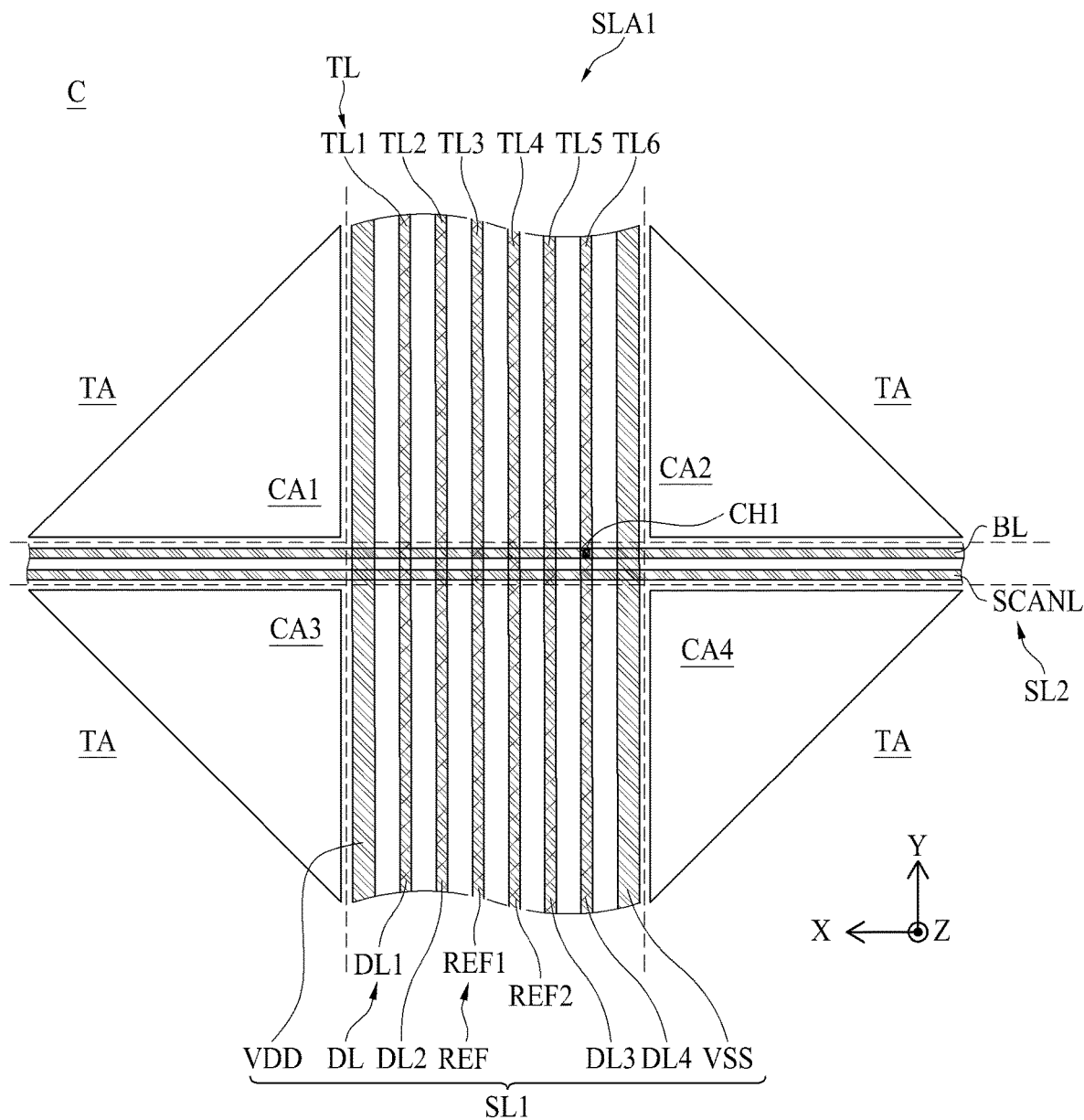
FIG. 16 is a view illustrating another example of signal lines and touch lines, which are provided in an area C of FIG. 14.

The transparent display panel 110 provided with the pixels P having a rhombus shape may be also applied to the signal lines SL1 and the touch lines TL, which are shown in FIGS. 9 to 11. FIG. 16 is a view illustrating another example of signal lines and touch lines, which are provided in an area C of FIG. 14, and shows an example in which the signal lines SL1 and the touch lines TL, which are shown in FIGS. 9 to 11, are applied to the transparent display panel 110 provided with the pixels P having a rhombus shape.

In the transparent display panel 110 provided with the pixels P having a rhombus shape as shown in FIG. 14, an area of the second signal line area SLA2, which crosses between the transmissive areas TA without being overlapped with the pixel P, has a size smaller than that in the transparent display panel 110 provided with the pixels P having a rectangular shape as shown in FIG. 3. Therefore, as shown in FIG. 14, the transparent display panel 110 provided with the pixels P having a rhombus shape may minimize or reduce decrease in light transmittance as the bridge line BL is added to the second signal line area SLA2.

According to the present disclosure, the following advantageous effects may be obtained.

In the present disclosure, the touch line is disposed to at least partially overlap the pixel, whereby light transmittance may be prevented from being deteriorated due to the touch line.

Also, in the present disclosure, the touch line is disposed so as not to overlap the circuit area, whereby the influence of the circuit element on the touch line may be minimized or reduced.

Also, in the present disclosure, the plurality of touch lines may be formed to be gathered in the middle area of the pixel. Therefore, in the present disclosure, the horizontal distance difference between the plurality of touch lines may be reduced, and uniformity of the parasitic capacitance may be improved.

Also, in the present disclosure, the first signal lines are formed in the same layer as the light shielding layer, whereby the vertical distance between the first signal line and the touch line may be increased. Therefore, in the present disclosure, parasitic capacitance of the touch line due to the first signal line may be reduced.

Also, in the present disclosure, the first signal lines and the touch lines may be formed to at least partially overlap each other. The present disclosure may enable linearity of the touch line and minimize or reduce the horizontal distance difference between the touch lines. Therefore, the present disclosure may reduce resistance of the touch line and improve uniformity of parasitic capacitance between the touch lines.

It will be apparent to those skilled in the art that the present disclosure described above is not limited by the above-described embodiments and the accompanying drawings and that various substitutions, modifications and variations can be made in the present disclosure without departing from the spirit or scope of the disclosures. Consequently, it is intended that all variations or modifications derived from the meaning, scope and equivalent concept of the claims fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transparent display device comprising:
   a substrate provided with a non-transmissive area and a transmissive area, the non-transmissive area including at least two light emission areas in which a light emitting element is disposed and at least two circuit areas in which a circuit element is disposed;

a plurality of first signal lines provided in the non-transmissive area over the substrate and extended in a first direction;
at least one insulating layer provided over the plurality of first signal lines;
a plurality of touch lines provided in the non-transmissive area over the at least one insulating layer and extended in the first direction;
a touch bridge extending in a second direction and connected with the plurality of touch lines; and
a cathode electrode in the non-transmissive area and spaced apart from the transmissive area,
wherein the plurality of first signal lines and the plurality of touch lines are disposed between adjacent circuit areas of the at least two circuit areas.

2. The transparent display device of claim 1, wherein the plurality of first signal lines and the plurality of touch lines are alternately disposed.

3. The transparent display device of claim 1, wherein each of the plurality of touch lines is disposed between two adjacent first signal lines of the plurality of first signal lines so as not to overlap the plurality of first signal lines.

4. The transparent display device of claim 1, wherein each of the plurality of touch lines at least partially overlaps a respective one of the plurality of first signal lines.

5. The transparent display device of claim 1, wherein each of the plurality of touch lines is provided in a straight line.

6. The transparent display device of claim 1, wherein the number of the plurality of touch lines is the same as the number of the plurality of first signal lines.

7. The transparent display device of claim 1, wherein the plurality of first signal lines include a plurality of data lines and at least one reference line.

8. The transparent display device of claim 7, wherein two reference lines of the at least one reference line are disposed between adjacent circuit areas.

9. The transparent display device of claim 7, wherein one of the at least one reference line at least partially overlaps at least one touch line of the plurality of touch lines, and has a width greater than that of the at least one touch line.

10. The transparent display device of claim 1, wherein each of the plurality of touch lines is disposed between the light emitting element and the substrate, and is disposed to at least partially overlap one of the at least two light emission areas.

11. The transparent display device of claim 1, further comprising:
a driving transistor provided over the substrate; and
a light shielding layer disposed between the substrate and the driving transistor,
wherein the plurality of first signal lines are provided in the same layer as the light shielding layer.

12. The transparent display device of claim 11, wherein the at least one insulating layer includes a passivation layer provided over the driving transistor, and the plurality of touch lines are provided over the passivation layer.

13. The transparent display device of claim 11, further comprising:
a first planarization layer provided between the driving transistor and the light emitting element; and
a second planarization layer provided over the first planarization layer,
wherein the plurality of touch lines are provided between the first planarization layer and the second planarization layer.

14. The transparent display device of claim 1, wherein the light emission area has a rhombus shape.

15. A transparent display device comprising:
a transmissive area in which a touch sensor is disposed; and
a non-transmissive area in which a light emitting element is disposed,
wherein the non-transmissive area includes:
a first signal line area having disposed therein a plurality of first signal lines extended in a first direction and supplying a signal to the light emitting element, and a plurality of touch lines extended in the first direction and electrically connected to the touch sensor;
a circuit area in which a circuit element connected to the light emitting element is disposed, including a first circuit area and a second circuit area, which are disposed to be symmetrical to each other with the first signal line area interposed therebetween;
a touch bridge extending in a second direction and connected with one of the plurality of touch lines; and
a cathode electrode in the non-transmissive area and spaced apart from transmissive area.

16. The transparent display device of claim 15, wherein the plurality of first signal lines and the plurality of touch lines are alternately disposed.

17. The transparent display device of claim 15, wherein each of the plurality of touch lines is disposed to at least partially overlap a respective one of the plurality of first signal lines with at least one insulating layer interposed therebetween.

18. The transparent display device of claim 15, wherein the plurality of first signal lines are disposed in a layer provided between the substrate and the circuit element, and the plurality of touch lines are disposed in a layer provided between the circuit element and the light emitting element.

19. The transparent display device of claim 15, further comprising a second signal line area in which a second signal line extended in the second direction.

20. The transparent display device of claim 19, wherein the circuit area further includes a third circuit area disposed to be symmetrical to the first circuit area with the second signal line area interposed therebetween, and a fourth circuit area disposed to be symmetrical to the second circuit area with the second signal line area interposed therebetween.

21. The transparent display device of claim 19, wherein the plurality of first signal lines include a plurality of data lines and at least one reference line, and the second signal line includes at least one scan line.

22. The transparent display device of claim 19, further comprising a plurality of subpixels disposed based on an overlap area where one of the plurality of first signal lines and the second signal line cross each other,
wherein each of the plurality of subpixels has a rhombus shape.

23. The transparent display device of claim 15, wherein the touch sensor includes a touch sensor electrode,
the light emitting element includes an anode electrode, a light emitting layer and the cathode electrode, and
the touch sensor electrode of the touch sensor and the cathode electrode of the light emitting element are formed of the same material in the same layer.

24. The transparent display device of claim 15, wherein the transmissive area has light transmittance of a first value or more, and the non-transmissive area has light transmittance of a second value or less, the second value being smaller than the first value.

25. The transparent display device of claim 15, wherein the cathode electrode is spaced apart from the touch sensor.

26. The transparent display device of claim 15, wherein the cathode electrode is not provided in the transmissive area.

27. The transparent display device of claim 15, wherein the touch sensor is provided in the transmissive area.

* * * * *